United States Patent [19]

Balkanski et al.

[11] Patent Number: 5,253,078
[45] Date of Patent: Oct. 12, 1993

[54] SYSTEM FOR COMPRESSION AND DECOMPRESSION OF VIDEO DATA USING DISCRETE COSINE TRANSFORM AND CODING TECHNIQUES

[75] Inventors: Alexandre Balkanski, Palo Alto; Stephen C. Purcell, Mountain View; James W. Kirkpatrick, Jr., San Jose; Mauro Bonomi, Palo Alto; Wen-Chang Hsu, Saratoga, all of Calif.

[73] Assignee: C-Cube Microsystems, Inc., San Jose, Calif.

[21] Appl. No.: 572,198

[22] Filed: Aug. 23, 1990

Related U.S. Application Data

[63] Continuation-in-part of Ser. No. 494,242, Mar. 14, 1990.

[51] Int. Cl.[5] .................. H04N 5/32; H04N 7/12
[52] U.S. Cl. ..................... 358/426; 358/135; 358/433; 358/432
[58] Field of Search ............ 358/133, 135, 426, 427, 358/432, 433, 443, 310; 382/56; 364/725, 726, 727, 728.01, 826

[56] References Cited

U.S. PATENT DOCUMENTS

| | | | |
|---|---|---|---|
| 4,704,628 | 11/1987 | Chen et al. | 358/135 |
| 4,847,677 | 7/1989 | Music et al. | 358/135 |
| 4,858,026 | 8/1989 | Richards | 358/135 |
| 4,910,609 | 3/1990 | Nicholas et al. | 358/433 |

Primary Examiner—Michael Razavi
Attorney, Agent, or Firm—Skjerven, Morrill, MacPherson, Franklin & Friel

[57] ABSTRACT

A digital video compression system and an apparatus implementing this system are disclosed. Specifically, matrices of pixels in RGB, YUV or CMYK formats are accepted for data compression. The data are rearranged in 8x8 pixel blocks, each block being of one pixel component type. The pixel data are then subjected to a discrete cosine transform (DCT). A quantization step eliminates DCT coefficients having amplitude below a set of preset thresholds. The video signal is further compressed by coding the elements of the quantized matrices in a zig-zag manner. This representation is further compressed by Huffman codes. Decompression of the signal is substantially the reverse of compression steps. The inverse discrete cosine transform (IDCT) may be implemented by the DCT circuit. The circuits may be implemented in a single integrated circuit chip. Three levels of compression rate control are provided during processing of video data.

13 Claims, 18 Drawing Sheets

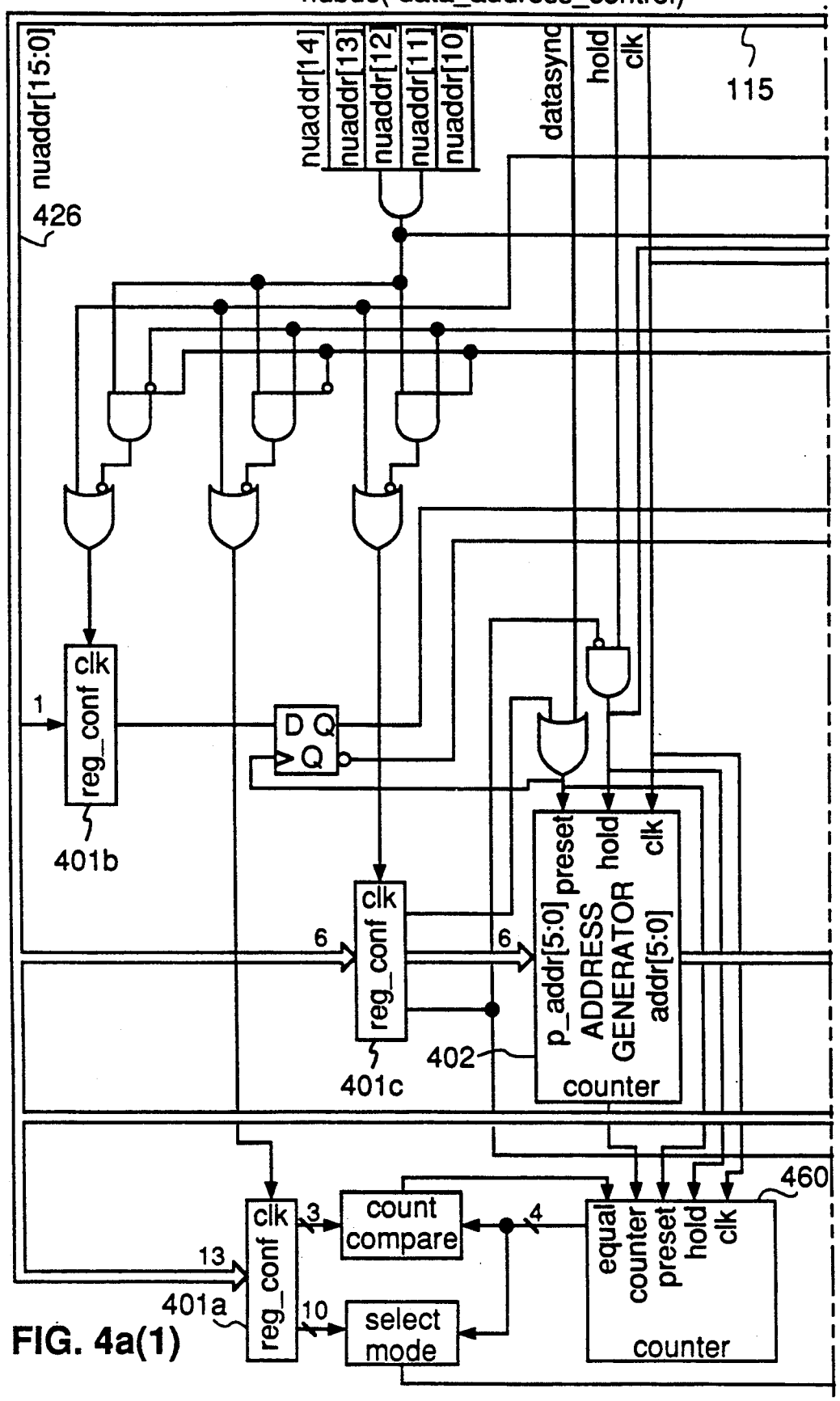
FIG. 4a(1)

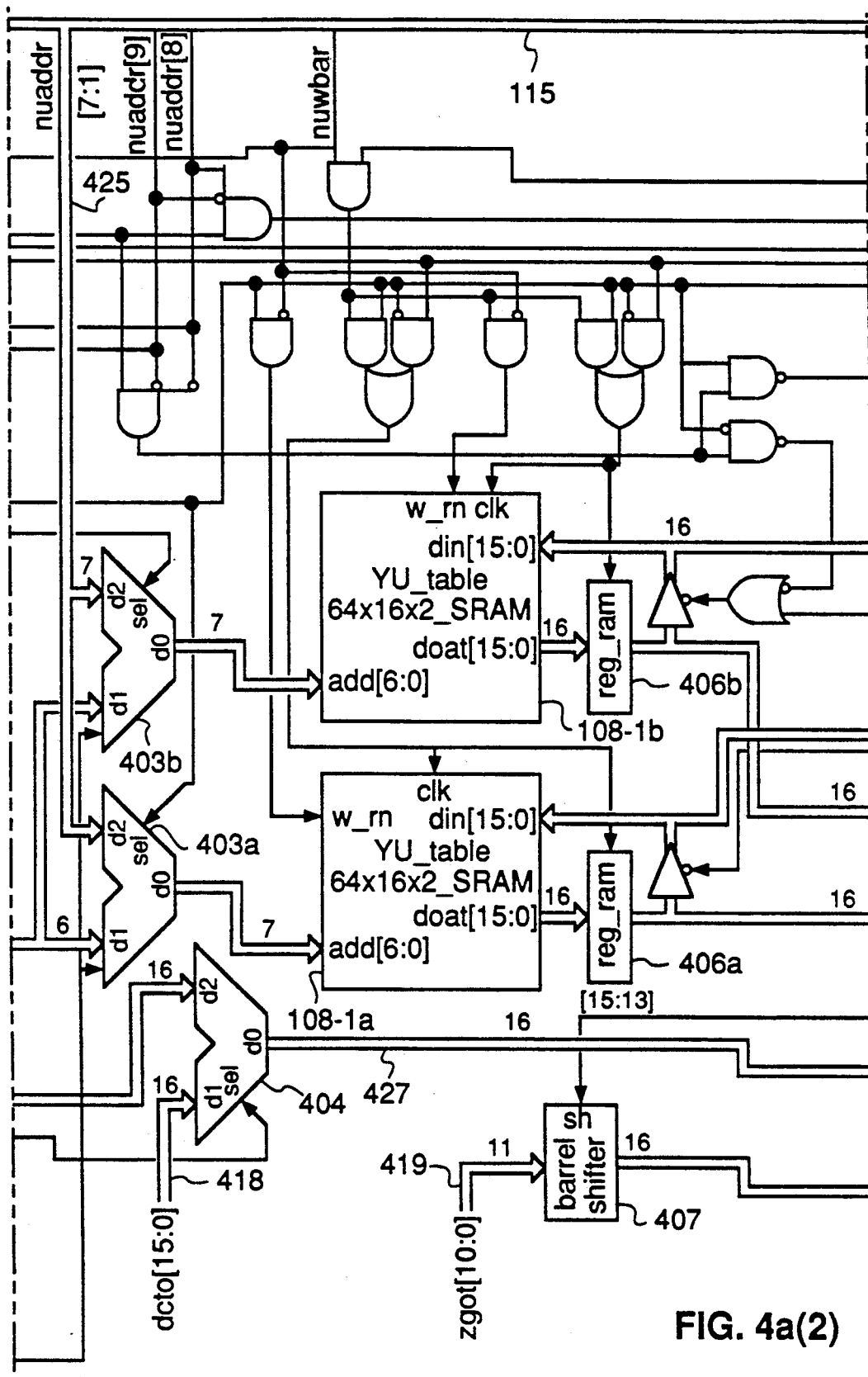
FIG. 4a(2)

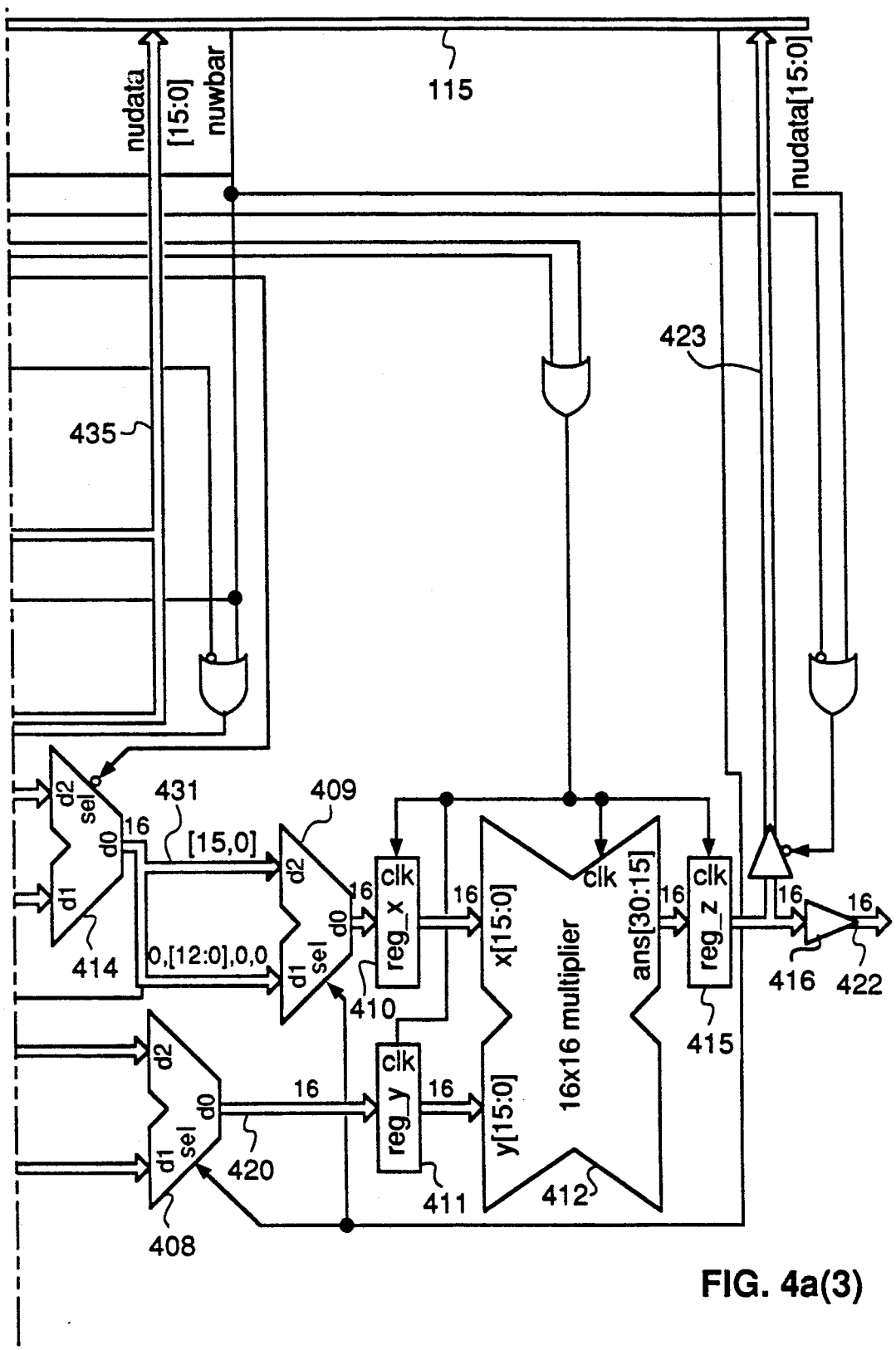
FIG. 4a(3)

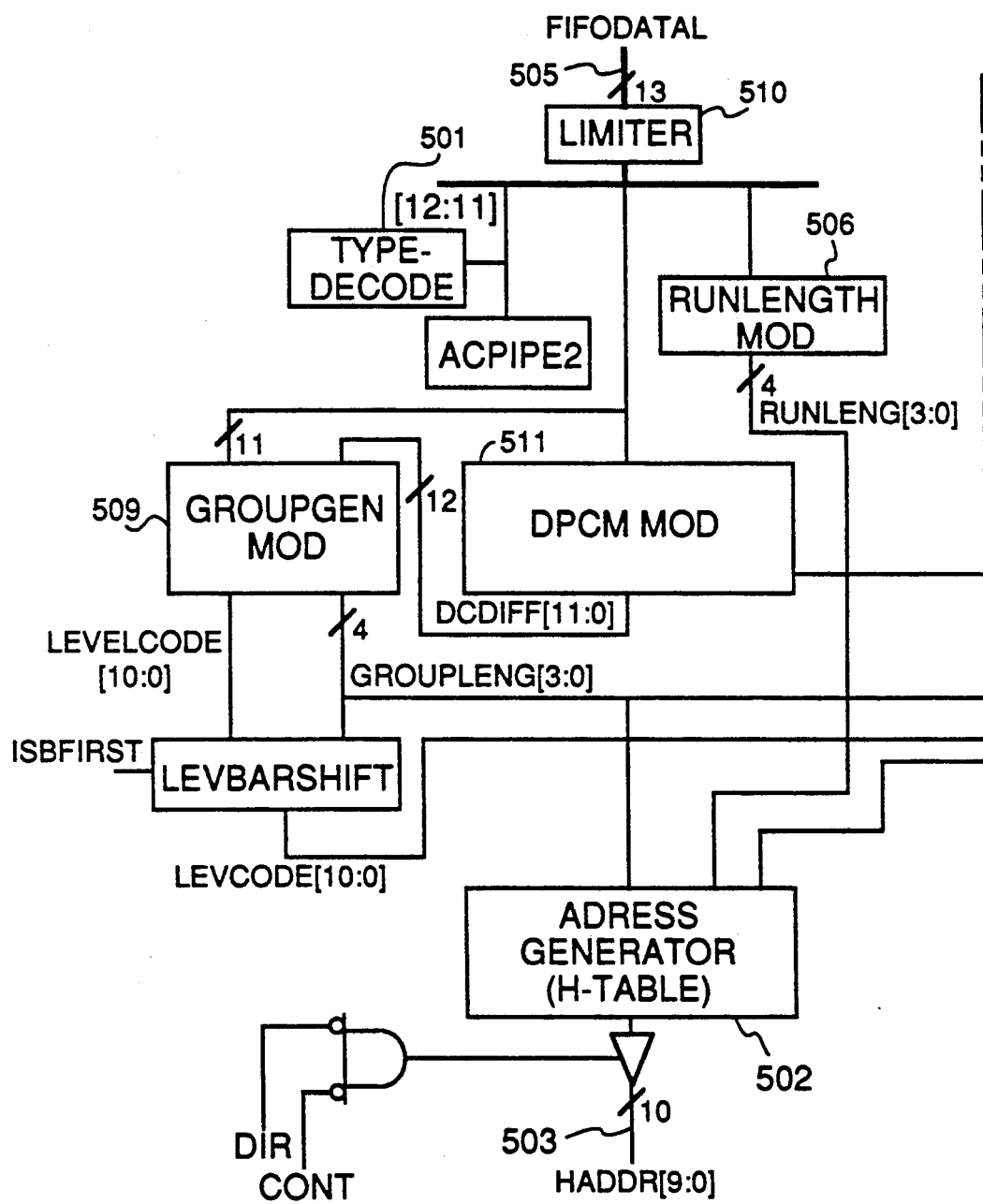
FIG. 6a(1)

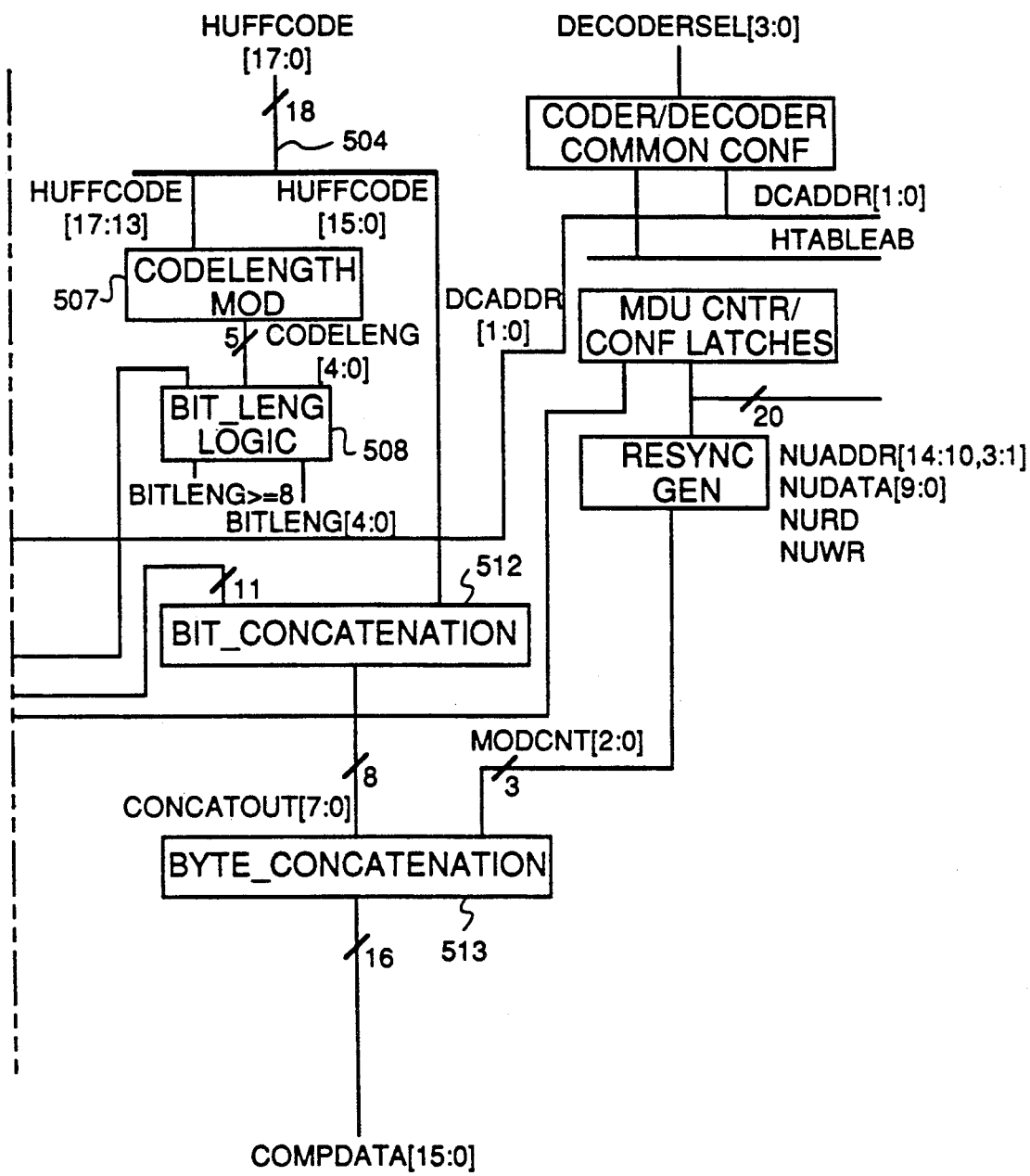
FIG. 6a(2)

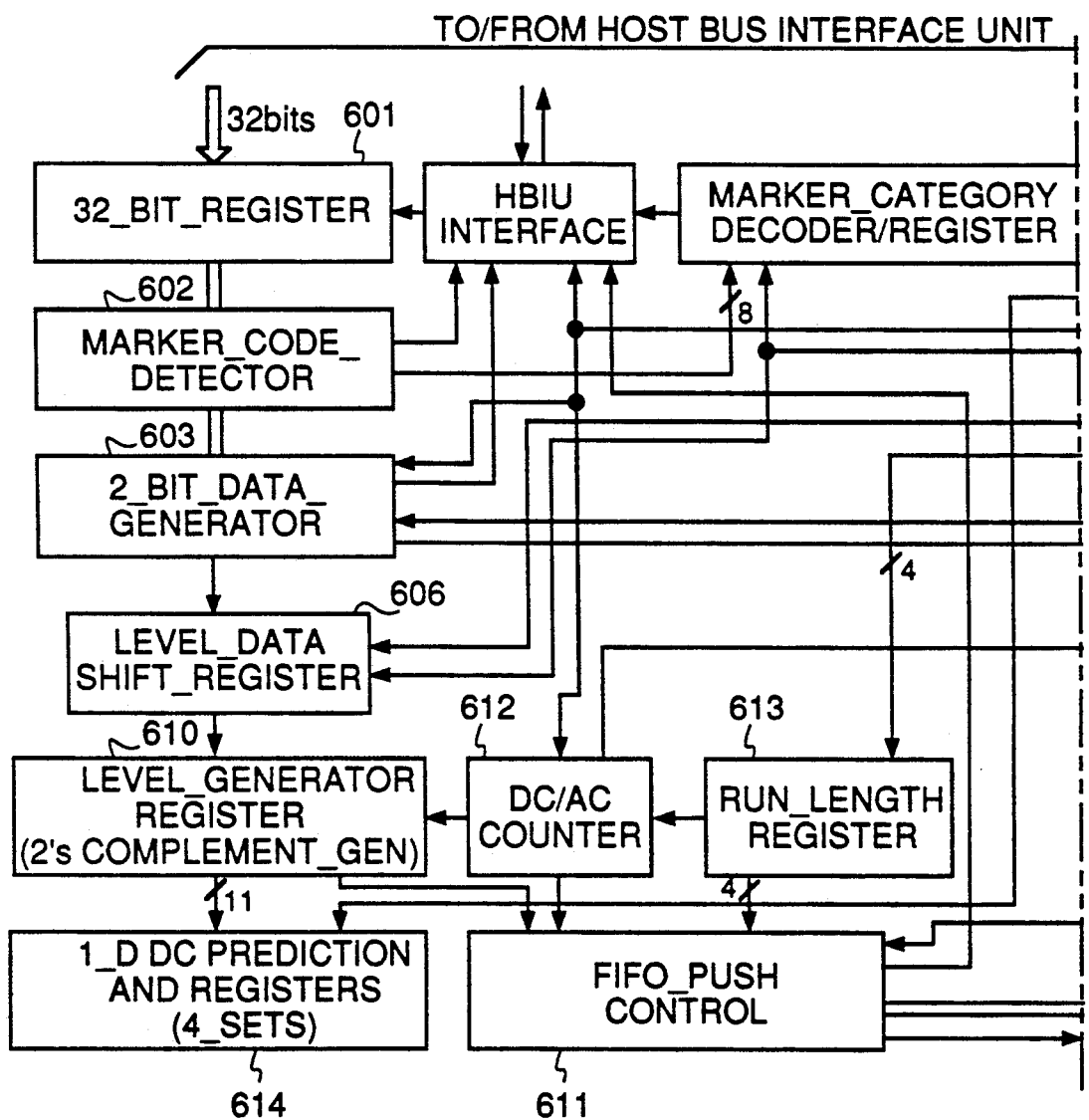
FIG. 6b(1)

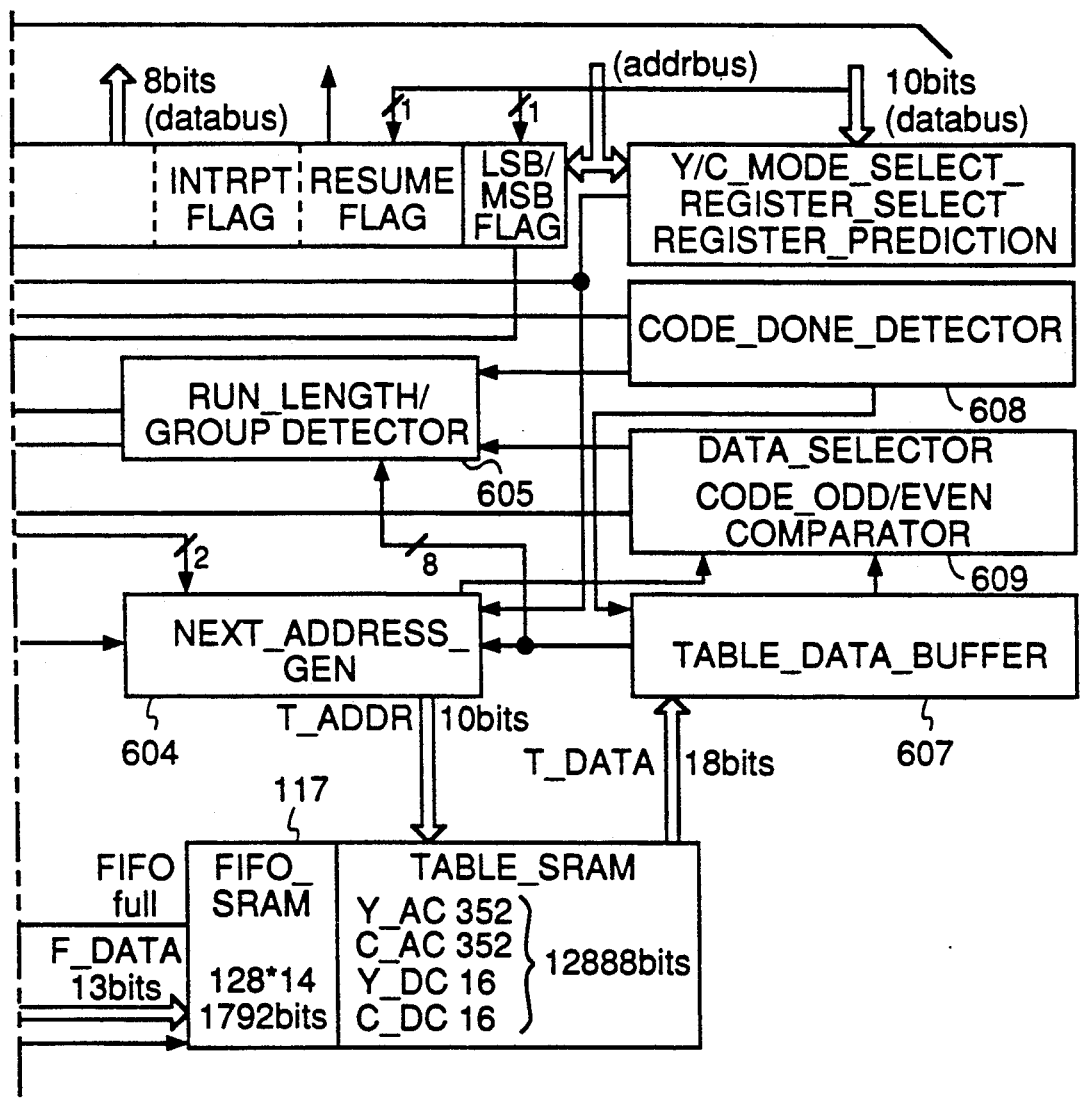
FIG. 6b(2)

SYSTEM FOR COMPRESSION AND DECOMPRESSION OF VIDEO DATA USING DISCRETE COSINE TRANSFORM AND CODING TECHNIQUES

RELATED APPLICATION

This is a continuation-in-part of copending application entitled "A System for Compression and Decompression of Video Data Using Discrete Cosine Transform and Coding Techniques", by A. Balkanski et al., Ser. No. 07/494,242, filed Mar. 14, 1990, assigned to C Cube Microsystems. Copending application Ser. No. 07/494,242 is hereby incorporated by reference in its entirety.

BACKGROUND OF THE INVENTION

This invention relates to the compression and decompression of data and in particular, to the reduction in the amount of data necessary to be stored for use in reproducing a high quality video picture.

DESCRIPTION OF THE PRIOR ART

In order to store images and video on a computer, the images and video must be captured and digitized. Image capture can be performed by a wide range of input devices, including scanners and video digitizers.

A digitized image is a large two-dimensional array of picture elements, or pixels. The quality of the image is a function of its resolution, which is measured in the number of horizontal and vertical pixels per unit length. For example, a standard display of 640 by 480 has 640 pixels across (horizontally) and 480 pixels from top to bottom (vertically). However, the resolution of an image is usually referred to in dots per inch (dpi). Dots per inch are quite literally the number of dots per inch of print capable of being used to make up an image measured both horizontally and vertically on, for example, either a monitor or a print medium. As more pixels are packed into smaller display area and more pixels are displayed on the screen, the detail of the image increases—as well as the amount of memory required to store the image.

A black and white image is an array of pixels that are either black or white, on or off. Each pixel requires only one bit of information. A black and white image is often referred to as a bi-level image. A gray scale image is one such that each pixel is usually represented using 8 bits of information. The number of shades of gray that can thus be represented is therefore equal to the number of permutations achievable on the 8 bits, given that each bit is either on or off, equal to $2^8$ or 256 shades of gray. In a color image, the number of possible colors that can be displayed is determined by the number of shades of each of the primary colors, Red, Green and Blue, and all their possible combinations. A color image is represented in full color with 24 bits per pixel. This means that each of the primary colors is assigned 8 bits, resulting in $2^8 \times 2^8 \times 2^8$ or 16.7 million colors possible in a single pixel. Note, in some applications in which hard copies of the image are produced, a further component specifying the quality of black is also used.

In other words, a black and white image, also referred to as a bi-level image, is a two dimensional array of pixels, each of 1 bit. A continuous-tone image can be a gray scale or a color image. A gray scale image is an image where each pixel is allocated 8-bits of information thereby displaying 256 shades of gray. A color image can be eight bits per pixel, corresponding to 256 colors or 24-bits per pixel corresponding to 16.7 million colors. A 24-bit color image, often called a true-color image, can be represented in one of several coordinate systems, the Red, Green and Blue (RGB) system being the most common. Another frequently used system is the Cyan, Magenta, Yellow and black (CMYK) system. The "K" pixel component specifies the quality of black, usually added since high quality black resulting from mixing of the primary colors is difficult to achieve. RGBK, which also has the black "K" pixel component, is also available.

The foremost problem with processing images and video in computers is the formidable storage, communication, and retrieval requirements associated with storing the bits representing the images and video.

A typical True Color (full color) video frame consists of over 300,000 pixels (the number of pixels on a 640 by 480 display), where each pixel is defined by one of 16.7 million colors (24-bit), requiring approximately a million bytes of memory. To achieve motion in, for example, an NTSC video application, one needs 30 frames per second or two gigabytes of memory to store one minute of video. Similarly, a full color standard still frame image (8.5 by 11 inches) that is scanned into a computer at 300 dpi requires in excess of 25 Megabytes of memory. Clearly these requirements are outside the realm of realistic storage capabilities.

Furthermore, the rate at which data need to be retrieved in order to display motion vastly exceeds the effective transfer rate of existing storage devices. Retrieving full color video for motion sequences as described above (30M bytes/sec) from current hard disk drives, assuming an effective disk transfer rate of about 1 Mbyte per second, is 30 times too slow; from a CD-ROM, assuming an effective transfer rate of 150 kbytes per second, is about 200 times too slow.

Therefore, image compression techniques aimed at reducing the size of the data sets while retaining high levels of image quality have been developed.

Because images exhibit a high level of pixel to pixel correlation, mathematical techniques operating upon the spatial Fourier transform of an image allow a significant reduction of the amount of data that is required to represent an image; such reduction is achieved by eliminating information to which the eye is not very sensitive. For example, the human eye is significantly more sensitive to black and white detail than to color detail, so that much color information in a picture may be eliminated without degrading the picture quality.

There are two means of image compression: lossy and lossless. Lossless image compression allows the mathematically exact restoration of the image data. Lossless compression can reduce the image data set by about one-half. Lossy compression does not preserve all information but it can reduce the amount of data by a factor of about thirty (30) without affecting image quality detectable by the human eye.

In order to achieve high compression ratios and still maintain a high image quality, computationally intensive algorithms must be relied upon. And further, it is required to run these algorithms in real time for many applications.

In fact, a large spectrum of applications requires the following:

(i) the real-time threshold of 1/30th of a second, in order to process frames in a motion sequence; and (ii) the human interactive threshold of under one (1) second, that can elapse between tasks without disrupting the workflow.

Since the processor capable of compressing a 1 Mbyte file in 1/30th of a second is also the processor capable of compressing 25 Mbyte file—a single color still frame image—in less than a second, such a processor will make a broad range of image compression applications feasible.

Such a processor will also find application in high resolution printing. Since having such a processor in the printing device will allow compressed data to be sent from a computer to a printer without requiring the bandwidth needed for sending non-compressed data, the compressed data so sent may reside in an economically reasonable amount of local memory inside the printer, and printing may be accomplished by decompressing the data in the processor within a reasonable amount of time.

Numerous techniques have been proposed to reduce the amount of data required to be stored in order to reproduce a high quality picture particularly for use with video displays. Because of the enormous amount of memory required, the ability to store a given quality picture with minimal data is not only important but also greatly enhances the utility of computer systems utilizing video displays.

Despite the prior art efforts, the information which must be stored to reproduce a video picture is still quite enormous. Therefore, substantial memory is required particularly if a computer system is to be used to generate a plurality of video images in sequence to replicate either changes in images or data. Furthermore, the prior art has also failed to provide a processor capable of processing video pictures in real time.

SUMMARY OF THE INVENTION

The present invention provides a data compression/decompression system capable of significant data compression of video or still images such that the compressed images may be stored in the mass storage media commonly found in conventional computers.

The present invention also provides
(i) a data compression/decompression system which will operate at real time speed, i.e. able to compress at least thirty frames of true color video per second, and to compress a full-color standard still frame (8.5"×11" at 300 dpi) within one second;
(ii) a system adhering to an external standard so as to allow compatibility with other computation or video equipment;
(iii) a data compression/decompression system capable of being implemented in an integrated circuit chip so as to achieve the economic and portability advantages of such implementation.

In accordance with this invention, a data compression/decompression system using a discrete cosine transform (DCT) and its inverse transform (IDCT) is provided to generate a frequency domain representation of the spatial domain waveforms, which represent the video image, and vice versa. The discrete cosine transform and its inverse transform are performed by finite impulse response (FIR) digital filters in a filter bank implemented as a DCT/IDCT processor. In this case, the inverse transform is obtained by passing the stored frequency domain signals through FIR digital filters to reproduce in the spatial domain the waveforms comprising the video picture. Thus, the advantage of simplicity in hardware implementation of FIR digital filters is realized. The filter bank in the DCT/IDCT processor according to this invention possesses the advantages of linear complexity and local communication. This system also provides Huffman coding of the transform domain data to effectuate large data compression ratios. This system preferably is implemented as an integrated circuit and communicates with a host computer using an industry standard bus provided in the data compression/decompression system according to the present invention. Accordingly, by combining in hardware the discrete cosine transform algorithm, quantization and coding steps, minimal data are required to be stored in real time for subsequent reproduction of a high quality replica of an original image. Three levels of adaptive compression rate control are provided to balance the need for providing a wide range of compression rates in real time and the requirement of real time play back.

This invention will be more fully understood in conjunction with the following detailed description taken together with the accompanying drawings.

BRIEF DESCRIPTION OF THE DRAWINGS

FIG. 4a shows a schematic block diagram of the quantizer unit 108 in the embodiment shown in FIG. 1.

FIG. 6a shows a block diagram of the coder unit 111a of the coder/decoder unit 111 in the embodiment shown in FIG. 1.

FIG. 6b shows a block diagram of the decoder unit 111b of the coder/decoder unit 111 in the embodiment shown in FIG. 1.

DETAILED DESCRIPTION

Data compression for image processing may be achieved by (i) using a coding technique efficient in the number of bits required to represent a given image, (ii) by eliminating redundancy, and (iii) by eliminating portions of data deemed unnecessary to achieve a certain quality level of image reproduction. The first two approaches involve no loss of information, while the third approach is "lossy". The acceptable amount of information loss is dependent upon the intended application of the data. For reproduction of image data for viewing by humans, significant amounts of data may be eliminated before noticeable degradation of image quality results.

According to the present invention, data compression is achieved by using Huffman coding (a coding technique), by eliminating redundancy and by eliminating portions of data deemed unnecessary for acceptable image reproduction. Because sensitivities of human vision to spatial variations in color and image intensity have been studied extensively in cognitive science, these characteristics of human vision are available for data compression of images intended for human viewing. In order to reduce data based on spatial variations, it is more convenient to represent and operate on the image represented in the frequency domain.

This invention performs data compression of the input discrete spatial signals in the frequency domain. The present invention transforms the discrete spatial signals into their frequency domain representations by a Discrete Cosine Transform (DCT). The discrete spatial signal can be restored by an inverse discrete cosine transform (IDCT). The method used for performing DCT and IDCT is discussed in the aforementioned copending application incorporated by reference above.

Overview of An Embodiment of the Present Invention

Figure 1:
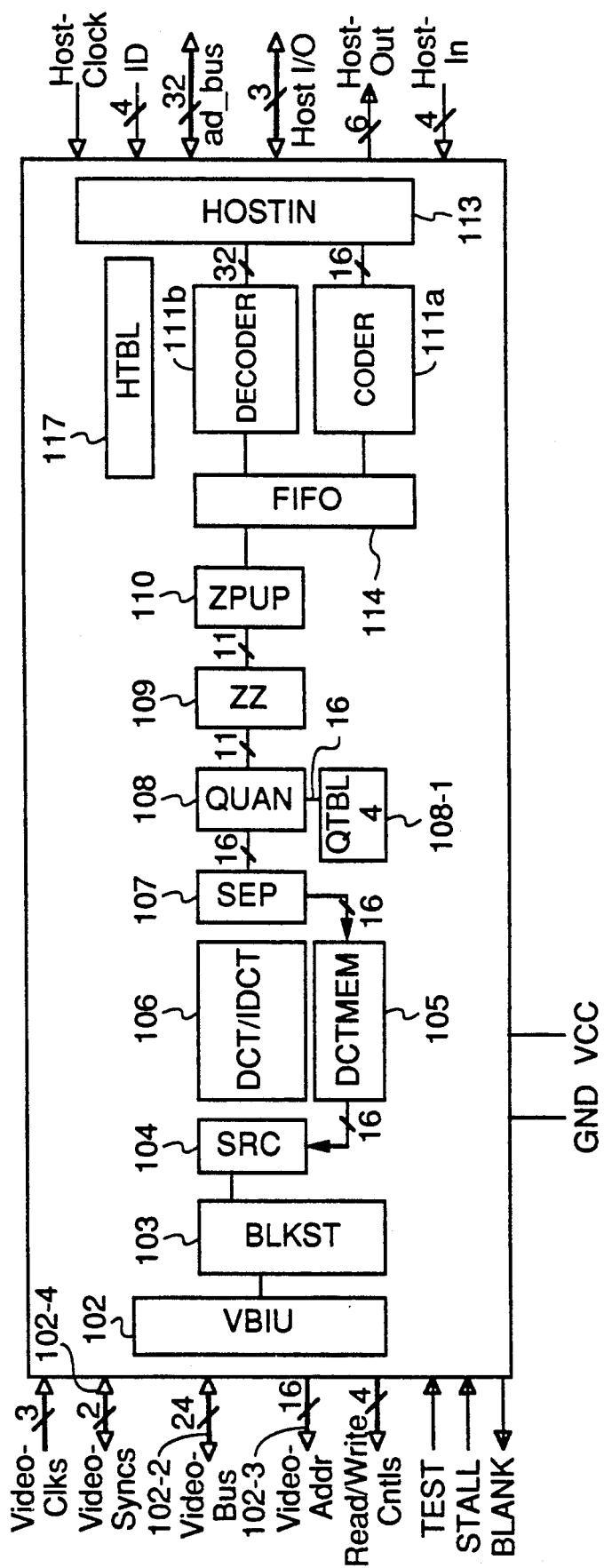
FIG. 1 shows a block diagram of an embodiment of the present invention.

FIG. 1 shows in block diagram form an embodiment of a data compression/decompression system of the present invention which implements the "baseline" algorithm of the JPEG standard. A concise description of the JPEG standard is found in "JPEG Still Picture Compression Algorithm" available from C-Cube Microsystems, and is also hereby incorporated by reference in its entirety. The embodiment of FIG. 1 is implemented in integrated circuit form; however, the use of other technologies to implement this architecture, such as by discrete components, or by software in a computer is also feasible.

The operation of this embodiment during data compression (i.e. to reduce the amount of data required to represent a given image) is first functionally described. The embodiment in FIG. 1 interfaces with external equipment supplying the video input data through the Video Bus Interface unit (VBIU) 102. Because the present invention provides compression and decompression (playback) of video signals in real-time, the present embodiment is capable of receiving and providing on synchronization bus 102-4 synchronization signals from and to the external video equipment (not shown).

Video Bus Interface unit (VBIU) 102 accepts input video signals via the 24-bit data I/O bus 102-2. The VBIU 102 also provides a 16-bit address on address bus 102-3 for use with an external memory buffer (not shown) addressable up to 8192 locations, at the user's option, to provide temporary storage of input or output data in the horizontal line-by-line ("video sequence") video data format used by certain video equipment, such as television. During compression, VBIU 102 generates addresses on bus 102-3 to read the stored video sequence data in the external memory buffer as 8×8 pixel blocks for input to VBIU 102 via I/O bus 102-2. During decompression, VBIU 102 provides on I/O bus 102-2 8×8 pixel blocks output into address locations specified on address bus 102-3, such that the external equipment may subsequently read the external buffer for Video sequence output. In this embodiment, the external memory buffer has a capacity of 8192 bytes.

The present embodiment of FIG. 1 has four modes of operation: a master mode and a slave mode in each of the compression and decompression operations. Under the master mode of either compression or decompression, VBIU 102 provides "hsynch" and "vsynch" signals on bus 102-4 for synchronization with the external equipment which uses video sequence data. "hsynch" is asserted at the beginning of each horizontal scan and "vsynch" is asserted at the beginning of each vertical scan. Under slave mode, synchronization signals "vsynch" and "hsynch" are provided to VBIU 102 on bus 102-4 by the external video equipment.

VBIU 102 accepts seven external video data formats: three color formats (RGB, RGBK, CMYK) and four luminance-chrominance (YUV) formats. The color formats are CMYK 4:4:4:4, RGB 4:4:4 and RGBK 4:4:4:4. The luminance-chrominance formats are YUV 4:1:1, YUV 4:2:2, YUV 4:4:4 and YUVK 4:4:4:4. In addition, at the user's option, VBIU 102 translates RGBK and RGB formats to YUVK and YUV formats respectively. In the case of RGB 4:4:4 formats, VBIU 102 allows conversion to either YUV 4:4:4 or YUV 4:2:2 at the user's option. The ratios indicate the ratios of the relative spatial sampling frequencies in each of the pixel components. In the color formats, each pixel is represented by three or, where applicable, four pixel component intensities corresponding to the pixel's intensity in each of the primary colors and black. For example, in the RBGK format, a pixel is specified by an intrinsic value in each of the three primary colors red (R), blue (B), and green (G), in addition to an intrinsic value in black (K). In the luminance-chrominance representations, the three pixel components Y, U and V represent respectively the luminance index (Y component) and two chrominance indices (U and V components) of the pixel. The K component in the each of RGBK, CMYK and YUVK formats is needed in color printing to specify the quality of black. Images of black obtained by combination of the other pixel components are often difficult to control for printing purposes or of mediocre quality detectable by the human eye.

Under the JPEG standard, a group of sixty-four pixels, expressed as an 8×8 matrix, is compressed or decompressed at a time. The sixty-four pixels in the RGB 4:4:4 and YUV 4:4:4 formats occupy on the physical display an 8×8 area in the horizontal and vertical directions. Because human vision is less sensitive towards chrominance than luminance, it is adequate in some applications to provide less samples of the U and V components relative to the Y component. Thus, in order to reduce the amount of data, YUV 4:2:2 and YUV 4:1:1 formats are often used, where U and V type data are expressed as horizontally averaged values over areas of 16 pixels by 8 pixels and 32 pixels by 8 pixels respectively while the Y values are not averaged. An 8×8 matrix in the spatial domain is called a "pixel" matrix, and the counterpart 8×8 matrix in the transform domain is called a "frequency" matrix.

At the user's option, as mentioned above, under certain compression operation modes, RGB 4:4:4 and YUV 4:4:4 formats may be represented in YUV 4:2:2 format. In these operation modes, RGB 4:4:4 data are first transformed to YUV 4:4:4 format by a series of arithmetic operations on the RGB data. The YUV 4:4:4 data thus obtained are then converted into YUV 4:2:2 data in the VBIU 102 by averaging neighboring pixels in the U, V components. By electing these operation modes, the amount of data to be processed is reduced by one-third. As mentioned above, the JPEG standard implements a "lossy" compression algorithm; the video information loss due to translation of the RGB 4:4:4 and YUV 4:4:4 formats to the YUV 4:2:2 format is not considered significant for many applications.

The K pixel components of the RGBK, YUVK, CMYK formats are identically represented. Therefore, RGBK 4:4:4:4 data may be converted to YUVK 4:4:4:4 data by applying to the R, G and B components the same set of arithmetic operations described above and passing the K component without modification. During decompression, if desired, the YUV 4:4:4 format is restored from the YUV 4:2:2 format by providing the average value in place of the missing sample value discarded during the compression operation. RGB 4:4:4 format is restored, if desired, from the YUV 4:4:4 format by reversing the arithmetic operations used to derive the YUV 4:4:4 data from RGB 4:4:4 data. RGBK 4:4:4:4 data are similarly restored from YUVK 4:4:4:4 data. The arithmetic operations used to convert RGB to YUV representations and vice versa are described in the aforementioned copending application incorporated by reference.

In addition to the above formats described, the present embodiment also allows the user to provide directly 8×8 pixel blocks of data of arbitrary pixel representation. This "format" is referred to as "bypass/monochrome." Bypass/monochrome is a data format encountered in two situations: bypass and monochrome operations. In the bypass operation, video data is either provided to or taken from this embodiment by the external video equipment directly without the use of the external memory buffer. In the monochrome operation, the video information is represented in the intensities of one color (hence, monochrome), which represent video data by intensities of three or four component types. In this embodiment the same data format "bypass/monochrome" is provided for both bypass and monochrome operations.

The data format and modes of operations are summarized below.

In summary, the present embodiment supports nine pixel formats, under four operation modes:

Formats
YUV 4:1:1
YUV 4:2:2
YUV 4:4:4 ⟷ YUV 4:2:2
RGB 4:4:4 ⟷ YUV 4:2:2
YUV 4:4:4 or RGB 4:4:4
RGB 4:4:4 ⟷ YUV 4:4:4
YUVK 4:4:4:4 or RGBK 4:4:4:4 or CMYK 4:4:4:4
RGBK 4:4:4:4 ⟷ YUVK 4:4:4:4
bypass/monochrome
Modes
Compression master mode
Compression slave mode
Decompression master mode
Decompression slave mode As a result of the processing in the VBIU unit 102, video data are supplied to the block memory unit 103, at sixteen bits (two 8-bit values) per clock period, for alternate "on" and "off" periods. During an "on" period, which lasts four clock periods, video data are supplied to the block memory unit 103 at the rate of sixteen bits. During an "off" period, also lasting four clock periods, no video data are supplied to the block memory unit 103. This pattern of alternately four "on" clock periods and four "off" clock periods corresponds to the read and write patterns in the block memory unit 103 discussed in the copending application which is incorporated by reference above.

The block memory unit 103 is a buffer for the incoming stream of 16-bit video data to be sorted into 8×8 blocks (matrices) such that each block contains sixty four values of the same pixel component type (e.g., Y, U or V). This buffering step is also essential because the discrete cosine transform (DCT) algorithm implemented herein is a 2-dimensional transform, requiring the video signal data to pass through the DCT/IDCT processor unit 106 twice, so that transform operation may operate on the video data once for each spatial direction (horizontal and vertical). Naturally, intermediate data ("first pass DCT" data) are obtained after the video input data pass through DCT/IDCT processor unit 106 once. As can be readily seen, as both video input data and first-pass DCT data are input to the DCT/IDCT processor unit 106, DCT/IDCT processor unit 106 must multiplex between video input data and the first-pass DCT data. To minimize the number of registers needed inside the DCT unit 106, and also to simplify the control signals within the DCT unit 106, the sequence in which the elements of the pixel matrix is processed is significant.

The sequencing of the video input data, and the first-pass data of the 2-dimensional DCT for input into DCT/IDCT processor unit 106 is performed by the DCT input select unit 104. DCT input select unit 104 alternatively selects, in predetermined order, either two 8-bit words from the block memory unit 103 or two 16-bit words from the DCT row storage unit 105, which contains the first-pass data of the 2-dimensional DCT. The data selected by DCT input select unit 104 are processed by the DCT/IDCT processor unit 106 in order. The results are either, in the case of data which have completed the 2-dimensional DCT, forwarded to the quantizer unit 108, or, in the case of first-pass DCT data, fed back via DCT row storage unit 105 for the second pass of the 2-dimensional DCT. This separation of data to supply either DCT row storage unit 105 or quantizer unit 108 is achieved in the DCT row/column separator unit 107. The result of the DCT operation yields two 16-bit first-pass or second-pass data every clock period. A double-buffering scheme in the DCT row/column separator 107 provides a continuous stream of transformed data, i.e., a 16-bit output datum per clock period, from DCT row/column separator unit 107 into the quantizer unit 108.

The operations of the DCT input select unit 104, the DCT row storage unit 105, the DCT/IDCT processor unit 106 and the DCT row/column separator unit 107 are described in detail in the aforementioned copending application, Ser. No. 07/494,242, incorporated by reference above.

The output data from the 2-dimensional DCT are organized as an 8 by 8 matrix, henceforth called a "frequency" matrix, corresponding to the spatial frequency coefficients of the original 8 by 8 pixel matrix. Each pixel matrix has a corresponding frequency matrix in the transform (frequency) domain as a result of the 2-dimensional DCT operation. According to its position in the frequency matrix, each element is multiplied in the quantizer 108 by a corresponding quantization constant taken from the YUV quantization tables 108-1. Quantization constants are values provided by either an international standard body, e.g. JPEG; or, alternatively, provided in accordance with a customized image processing function supplied by a host computer. The quantizer unit 108 contains a 16-bit by 16-bit multiplier for multiplying the 16-bit input from the row/column separator unit 107 by the corresponding 16-bit quantization constant taken from the YUV quantization tables 108-1. The result of the multiplication is a 32-bit value with bit 31 as the most significant bit and bit 0 as the least significant bit. In this embodiment, to meet the dual goals of allowing a reasonable dynamic range and, at the same time, minimizing the number of significant bits for simpler hardware implementation, only an 11-bit range which is empirically determined to be adequate are preserved. According to this scheme, a 1 is added at position bit 14 in order to round up the number represented by bits 31 through 15. The six most significant bits, and the fifteen least significant bits of this 32-bit multiplication result are then discarded. The net result is an 11-bit value which is passed to the zig-zag unit 109 described below. Because the quantization step tends to set the higher frequency coefficients of the frequency matrix to zero, the quantization unit 108 acts as a low-pass digital filter. Because of the DCT algorithm, the lower frequency coefficients are represented in the lower elements of the respective frequency matrices, i.e. element $A_{ij}$ represents higher frequency coefficients of the original image than element $A_{mn}$, in both horizontal and vertical directions, if $i > m$ and $j > n$.

The zig-zag unit 109 thus receives an 11-bit datum every clock period. Each datum is a quantized element of the 8 by 8 frequency matrix. As the data come in, they are each individually written into a location of a 64-location memory array, in which each location represents an element of the frequency matrix. As soon as the memory array is filled, the elements of the frequency matrix are read out in a manner corresponding to reading an 8 by 8 matrix in a zig-zag manner starting from the 00 position (i.e., in the order: $A_{00}$, $A_{10}$, $A_{01}$, $A_{02}$, $A_{11}$, $A_{20}$, $A_{30}$, $A_{12}$, $A_{03}$, etc.). Because the quantization steps tend to zero higher frequency coefficients, this method of reading the 8 by 8 frequency matrix is most likely to result in long runs of zeroed frequency coefficients, providing a convenient means of compressing the data sequence by representing a long run of zeroes as a run length rather than individual values of zero (i.e. the removing redundancy). The run length is then encoded in the zero packer/unpacker unit of 110.

Because of the double-buffering scheme in the zig-zag unit 109, which provides for accumulation of the current 64 11-bit values and simultaneously reading out the prior 64 11-bit values in run length format, a continuous stream of 11-bit data is made available to the zero packer/unpacker unit 110. This data stream is packed into a format in which each datum is either a DC, AC, RL or EOB type datum. There is only one DC type datum, called the DC coefficient, in each 8 by 8 frequency matrix. The DC coefficient correspond to the $A_{00}$ element of the frequency matrix. All other elements of the frequency matrix are referred to as AC coefficients. The RL type datum encodes a run of zeroes in the frequency matrix read in the zig-zag manner discussed above. The EOB type datum represents that the remaining elements in the frequency matrix, as read in the zig-zag manner provided above, are all zeroes. This data stream is then stored in a first-in first-out (FIFO) memory array 114 for encoding into a compressed data representation in the next step. The compressed data representation in this instance is Huffman codes. This FIFO memory array 114 provides temporary storage for the zero-packed data to be retrieved by the coder/decoder unit 111 under direction of a host computer through the host bus interface unit 113. The Huffman code tables (for coding and decoding) are stored in Huffman tables 117, which comprises a static random access memory array loaded at system initialization. The Huffman tables 117 are read by the coder unit 111a during compression and read by the decoder unit 111b during decompression. The temporary storage in FIFO memory 114 is necessary because, unlike the previous signal processing steps on the incoming video signal (which is provided to the VBIU 102 continuously and which must be processed in real time) by functional units 102 through 110, the coding step is performed under the control of an external host computer, which interacts with this embodiment of the present invention asynchronously through the host bus interface unit 113.

The FIFO memory 114 is a dual-port memory which allows simultaneous read and write. During compression, the zero-packed data are written into the FIFO memory 114 by the zero packer/unpacker 110, and read by the coder unit 111a. During decompression, Huffman-decoded data are written into the FIFO memory 114 by decoder unit 111b and read by zero-packer/unpacker 110.

During compression, the coder unit 111a translates the zero-packed data into Huffman codes using the Huffman code tables 117. The Huffman-coded data are then sent through the host bus interface unit 113 to a host computer (not shown) for storage in mass storage media. The host computer may communicate directly with various modules of the system, including the quantizer 108 and the DCT block memory 103, through the host bus 115 (see, e.g., FIG. 4a).

The architecture of the present embodiment is of the type which may be described as a heavily "pipelined" processor. One prominent feature of such processor is that a functional block at any given time is operating on a set of data related to the set of data operated on by another functional block by a fixed "latency" relationship, i.e. delay in time. To provide synchronization among functional blocks, a set of configuration registers are provided. Besides maintaining proper latency among functional blocks, these configuration registers also contain other configuration information.

Decompression of the video signal is accomplished substantially in the reverse manner of compression.

Minimum Data Unit

The concept of a minimum data unit facilitates the control of this embodiment of the present invention by providing a generalized control mechanism. A minimum data unit is the minimum number of blocks ($8 \times 8$ block data) the present embodiment must process before returning to the initial state. For example, with YUV 4:1:1 format data, the present embodiment must process in cycles of four blocks of Y data, and one block each of U and V data. Therefore, the minimum data unit is 6. With YUV 4:2:2 format data, the present embodiment processes cycles of two blocks of Y data, and one block each of U and V data. Thus, minimum data unit in this instance is 4. It can readily be seen that for YUV 4:4:4 data, the minimum data unit is 3, and for YUVK 4:4:4:4, the minimum data unit is 4.

Each functional unit sets its internal control according to the minimum data unit defined, and are synchronized by the latency values stored in each functional units configuration register. Each functional unit operates as a finite state machine with a periodicity defined by the minimum data unit. In this embodiment, the minimum data unit may be any number from 1 to 10. Using this concept of a minimum data unit, after receipt of a global start signal, control within the functional unit may be provided locally by a counter, and communication of control information between functional units is kept to the minimum due to synchronization by the latency values, which keep all functional units in step.

Structure and Operation of the Video Bus Interface Unit 102

Video bus interface unit 102 provides a bi-directional data conversion between digitized video sequence data and 8×8 pixel block format data, and also controls data flow between the external video equipment and the present embodiment.

The present embodiment may take input from an external memory buffer, also called the "external strip buffer". Eight lines of horizontal line-by-line ("video sequence") data are latched into the external strip buffer (not shown) under the control of VBIU 102. VBIU 102 then reads the stored data into this embodiment of the present invention in 8×8 "block video pixel" format. As mentioned above, the "block video pixel" format comprises sixty-four pixels corresponding to an 8×8 pixel area in the image. Each pixel is described, dependent upon the data format used, by three or four pixel component types, e.g. each pixel in RGB 4:4:4 format is described by the three intensities R, G and B. Internally, except under the "bypass/monochrome" data format (which is provided either under "bypass" or "monochrome" operations explained above), the block video pixel format is sorted in the block memory unit 103 into three or four 64-value pixel component matrices, according to the data format of the video data. Each matrix is said to be in "8×8 block" format. Under the "bypass" operation, as explained above, the input data are already in the 8×8 block format because the external video equipment provides input video data already in pixel component matrices in the 8×8 block format. In the "monochrome" operation, only one color is provided to represent the video data.

During decompression, after converting the data from each component 8×8 block format in the block memory 103 into 8×8 video pixel format, VBIU 102 stores 8×8 block video pixel format data from the present embodiment into the external strip buffer memory at locations such that line-by-line video sequence data may be subsequently read out to the external video equipment.

In both compression and decompression, the present embodiment can be in either slave or master mode. (Under slave modes, the external equipment provides the present embodiment synchronization signals "hsynch" and "vsynch". These signals are provided by VBIU 102 under the master modes.)

The VBIU 102 handles the following nine video pixel data formats:

| | |
|---|---|
| YUV/4:1:1 | (normal rate) |
| YUV/4:2:2 | (normal rate) |
| YUV/4:4:4 to YUV/4:2:2 conversion | (normal rate) |
| RGB/4:4:4 to YUV/4:2:2 conversion | (normal rate) |
| YUV/4:4:4 or RGB/4:4:4 component | (half rate) |
| RGB/4:4:4 to YUV/4:4:4 conversion | (half rate) |
| YUVK/4:4:4:4 or RGBK/4:4:4:4 or CMYK/4:4:4:4 component | (half rate) |
| RGBK/4:4:4:4 to YUVK/4:4:4:4 conversion | (half rate) |
| bypass/monochrome | (double rate) |

The qualifications in parentheses, e.g., "normal rate", correspond to the data input rate when the associated input data are supplied to VBIU 102. Under normal rate, one pixel is provided every two pixel clock periods on I/0 bus 102-2. Under half rate, one pixel is provided every four pixel clock periods at I/O bus 102-2. Under "double rate" two pixels are provided every two clock cycles.

Figure 3A:
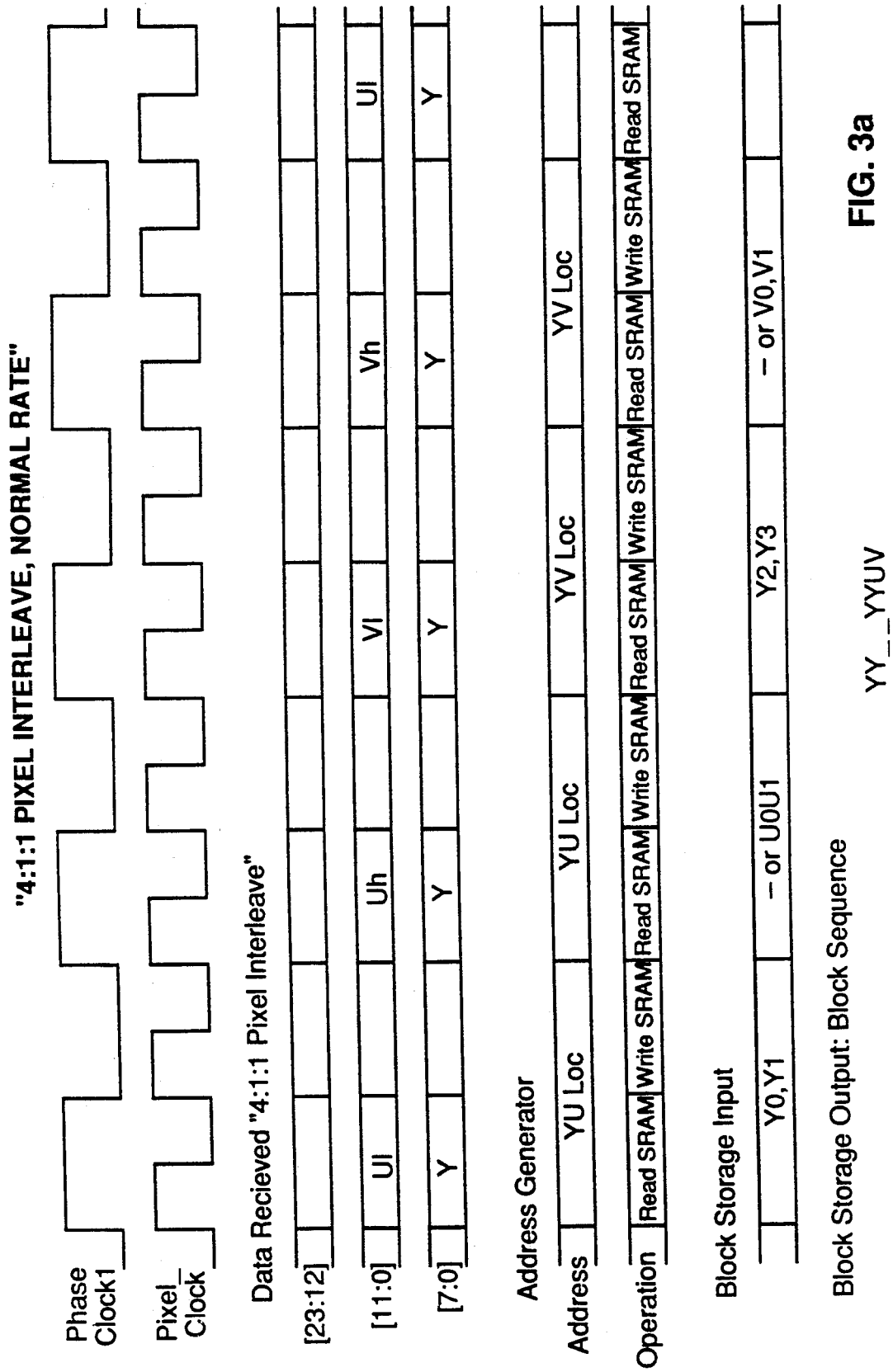
FIG. 3a shows sequences of data flow from the input data bus 102-2, through VBIU 102 and Block memory Unit (BMU) 103, to the DCT input select unit 104, under 4:1:1 data formats.

FIG. 3a shows the "normal rate" operation under the 4:1:1 formats, using the YUV 4:1:1 format as an example. As shown in FIG. 3a, twelve of data are transmitted in two pixel clock periods on the I/O bus 102-2. Each 12-bit datum contains an 8-bit value of the Y pixel component type and a high nibble or a low nibble of an 8-bit value of either U or V pixel component type. As a result, four 8-bit values of the Y pixel component type are provided for every one of each 8-bit value of the U and V component types. Other 4:1:1 formats are provided similarly.

Figure 3B:
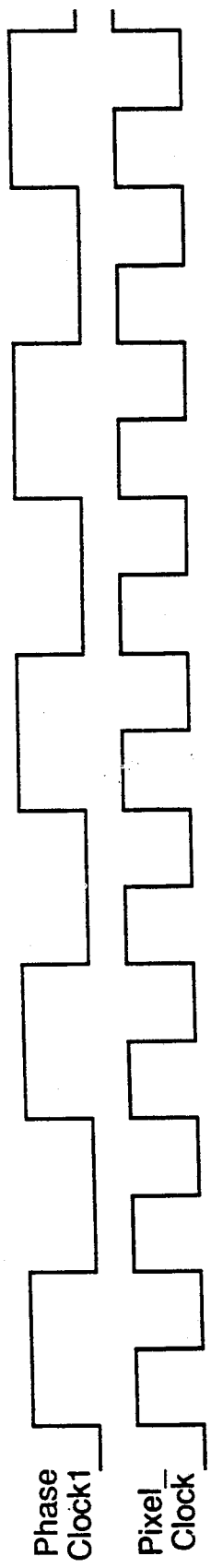
FIG. 3b shows sequences of data flow from the input data bus 102-2, through VBIU 102 and Block Memory Unit (BMU) 103, to the DCT input select unit 104, under 4:2:2 data formats.

FIG. 3b shows the "normal rate" operation under 4:2:2 formats, using the YUV 4:2:2 format as an example. In the 4:2:2 formats, sixteen bits of data are provided on the I/O bus 102-2. As shown in FIG. 3b, an 8-bit value of the Y pixel component type and an 8-bit value of either the U or the V pixel component type is provided every two pixel clock periods.

Figure 3C:
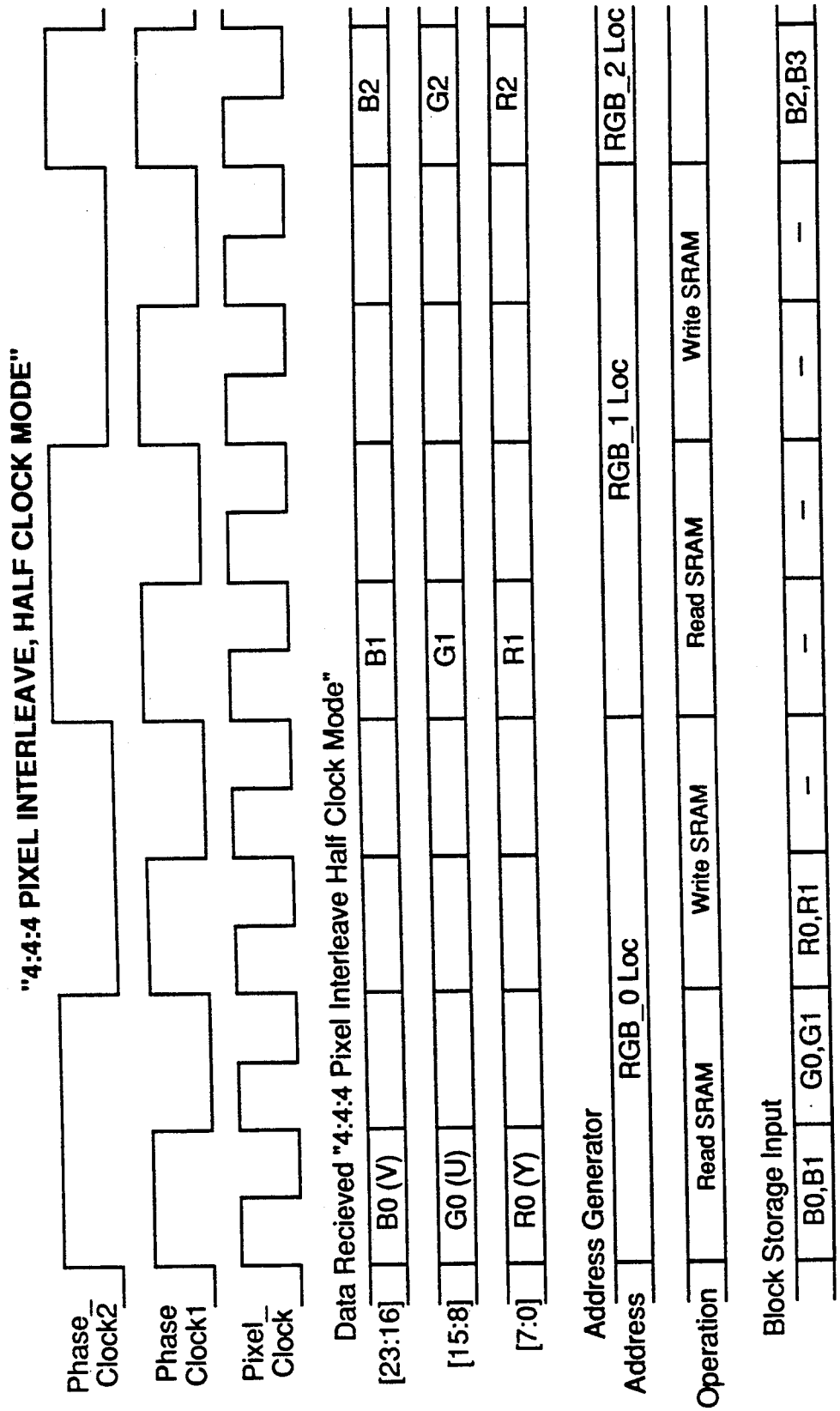
FIG. 3c shows sequences of data flow from the input data bus 102-2, through VBIU 102 and Block Memory Unit (BMU) 103, to the DCT input select unit 104, under 4:4:4 data formats.

FIG. 3c shows the "half rate" operation under 4:4:4 data formats, using RGB 4:4:4 as an example. Under 4:4:4 data formats, a 24-bit value comprising three fields, each 8-bit wide, is received on I/O data bus 102-2 by the VBIU 102 every four pixel clock cycles. As shown, bits 0 through 7 of I/O data bus 102-2 contains an R type value, bits 8 through 15 contains a G type value, and bits 16 through 23 contains a B type value Hence, each 24-bit word corresponds to one pixel. Other 4:4:4 formats are provided in a similar manner.

Figure 3D:
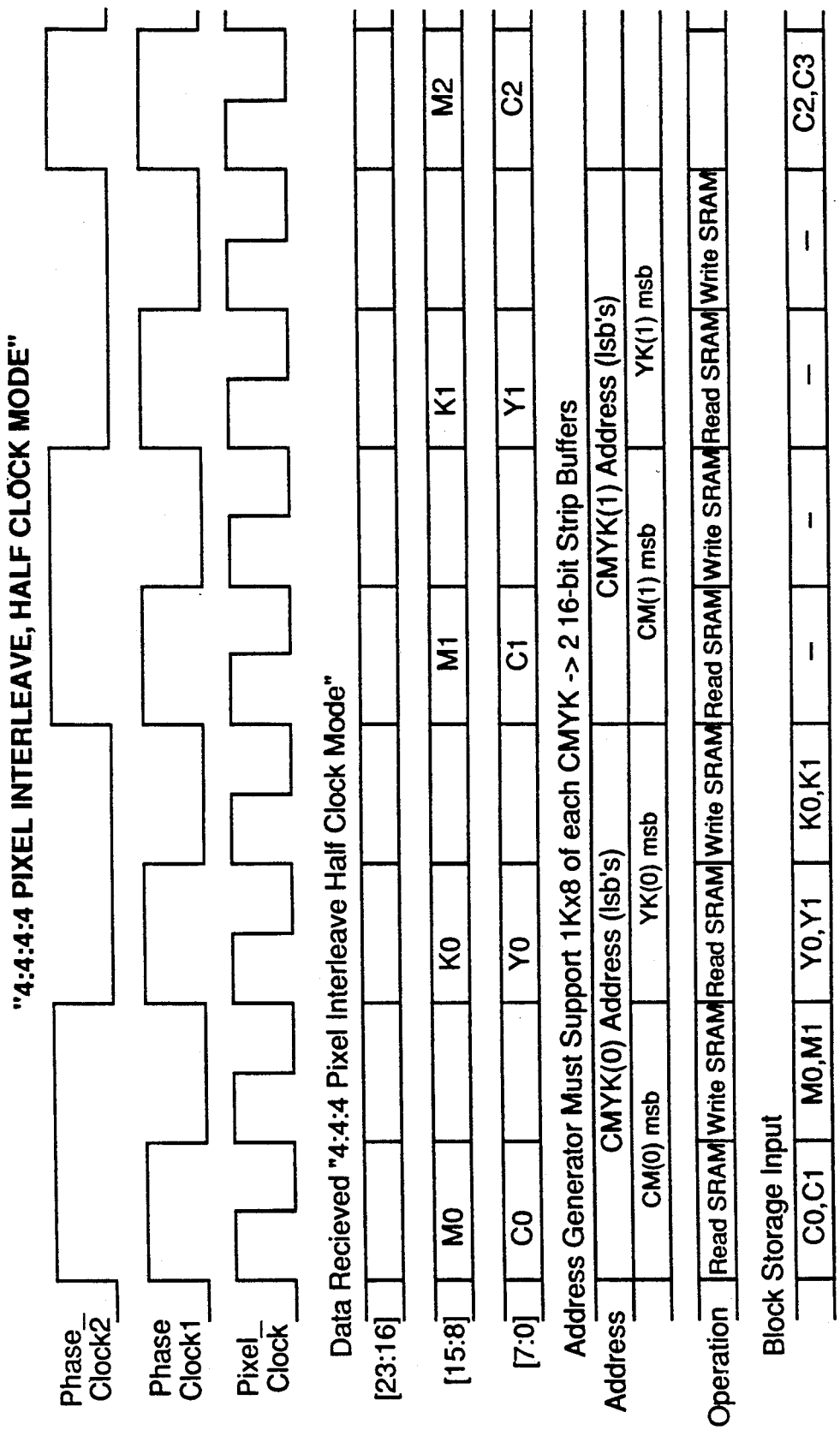
FIG. 3d shows sequences of data flow from the input data bus 102-2, through VBIU 102 and Block memory Unit (BMU) 103, to the DCT input select unit 104 under 4:4:4:4 data formats.

FIG. 3d shows the "half rate" operation under 4:4:4:4 formats, using the CMYK 4:4:4:4 format as an example. Unlike the 4:4:4 data formats, under the 4:4:4:4 formats, only bits 0 through 15 of I/O bus 102-2 contain data. Every two pixel clock cycles, two 8-bit values of C and M, or Y and K types are transmitted. Since a pixel in the CMYK 4:4:4:4 format consists of four 8-bit values, a pixel is transmitted every four pixel clock cycles. Other 4:4:4:4 formats are provided similarly.

Figure 3E:
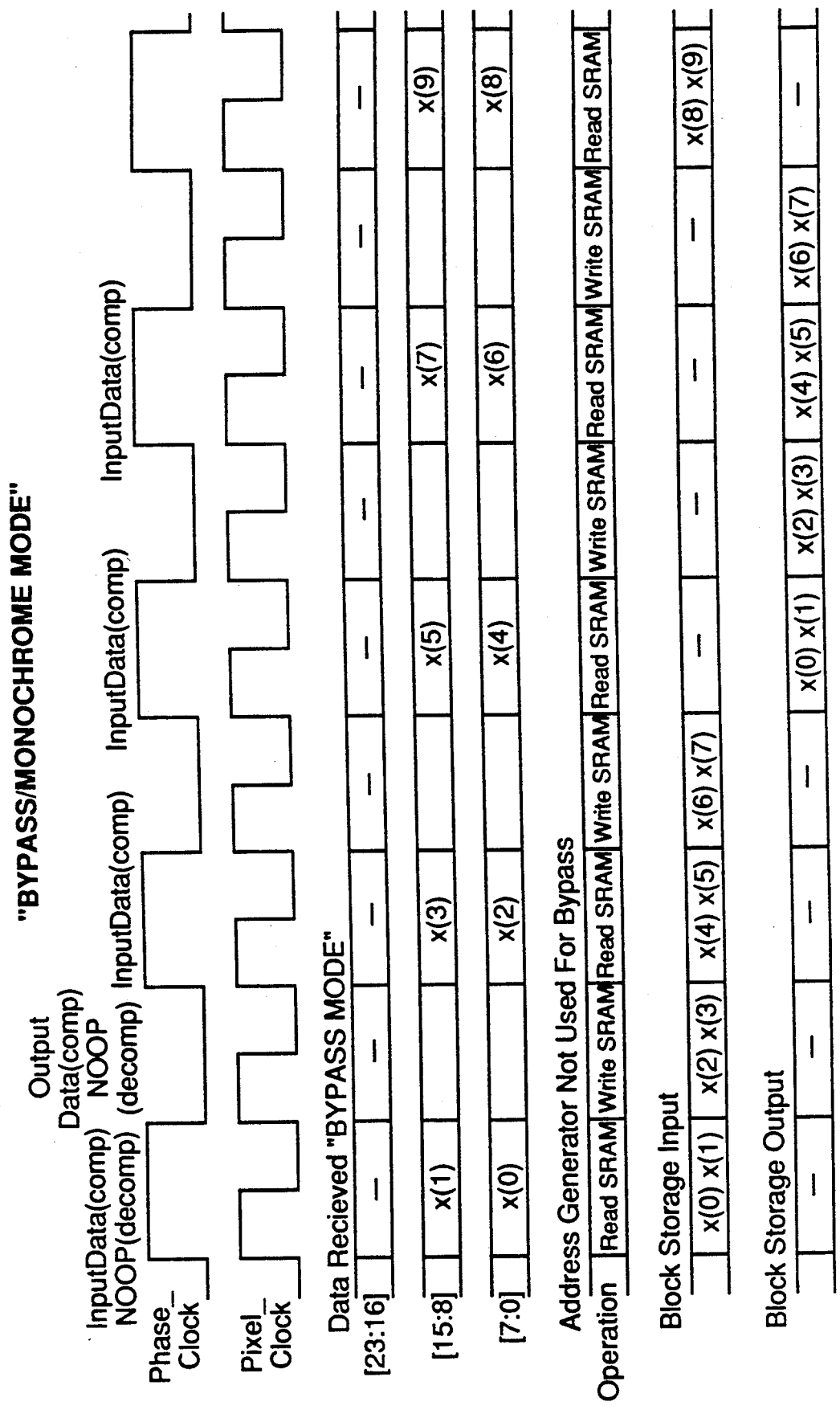
FIG. 3e shows sequences of data flow from the input data bus 102-2, through VBIU 102 and Block Memory Unit (BMU) 103, to the DCT input select unit 104 under bypass format.

FIG. 3e shows the "bypass" mode operation. As discussed above, rather than 8×8 block video pixel data, 8×8 block format data are transmitted under the "bypass" mode. In 8×8 block format data, the 64 values of the same pixel component type are transmitted without being interleaved with values of other pixel component types, as in the 8×8 block video pixel data formats. Under the bypass mode, only 16 bits of the 24-bit I/O bus 102-2 are used. Because four values every four pixel clock periods are provided, this mode of operation is described as "double rate".

Compression slave mode functions

Under compression slave mode, VBIU 102 gets video sequence data from the external video equipment according to video synchronous signals 'hsyncn' and 'vsyncn', and pixel timing clocks 'clkin', 'phase1in', and 'phase2in'. The picture window size and window location are set by Host Bus Interface Unit (HBIU) 113, which stores the window size and window location into VBIU 102's internal configuration registers. To start VBIU 102 operation, HBIU 113 asserts 'start' signal at logic high.

At the first negative edge of 'vsyncn' signal input after the 'start' signal is asserted logic high, operations in VBIU 102 begin. VBIU 102 keeps count of the video horizontal lines using the negative edge of the 'hsyncn' signal received. When the video signal reaches the top line of the picture window, also called "video frame", VBIU 102 starts to count the horizontal pixels using 'clkin', 'phase1in', and 'phase2in' clock input signals. When it reaches the top-left of the target window, VBIU 102 requests the external equipment to output video pixel data onto I/O bus 102-2 for storing into the external buffer memory. VBIU 102 continues to request video data to be stored in the external buffer memory until the right end of the target window is reached. Video data input into the external buffer memory is then halted until the left end of the target window in the next line is reached. Video data input into the external buffer memory is continued in this manner until the first 8 lines of the target window data are completely written into the external buffer memory. The target window data are then ready for read out by the VBIU 102 in 2-dimensional 8×8 block video pixel data as input data.

As the left end of the ninth line in the picture window is reached, the 8×8 pixel block of the target window is read from the external buffer memory into the present embodiment pixel by pixel. VBIU 102 then requests the external video equipment to provide the next 8 lines (next target window) of the video data into the external memory buffer at the memory locations in which the last 8×8 block video pixel data are read. This method of writing new data "in-line" into memory locations from which data are just read keeps the external buffer memory size to the minimum necessary to support this operation. An example of the Operation of an "in-line" memory is described in conjunction with the DCT row storage unit 105 in the aforementioned copending application incorporated by reference. In this embodiment, the number of horizontal lines in each target window must be a multiple of eight up to 8192 lines. In addition, however, the 4:1:1 data format requires the number of pixels in the horizontal direction to be a multiple of thirty-two in order to perform the necessary averaging in the U and V pixel component types. Likewise, for 4:2:2 data formats, the number of pixels in the horizontal direction must be a multiple of sixteen. For other formats, the number of pixels in the horizontal direction is eight. As discussed above, the 4:4:4:4 and the 4:4:4 formats are provided at "half" rate i.e. one pixel per four clock cycles, the 4:1:1 and 4:2:2 formats are provided at "normal rate," i.e., one pixel every two clock cycles, and the bypass/monochrome format is provided at "double" rate, i.e., one pixel per clock cycle.

If the 'start' signal is brought to logic low before the next negative edge of 'vsyncn' signal input, (i.e., the next video frame) VBIU 102 stops the operation after the data of this target window are completely processed. However, if the 'start' signal remains at logic high, the next target window is processed exactly as the previous window, as discussed above.

Compression Master Mode

Under compression master mode, VBIU 102 generates video synchronous signals 'hsyncn' and 'vsyncn' according to the target screen size provided in VBIU 102's configuration registers by HBIU 113, video sequence data are provided by the external video equipment using these video synchronous signals in conjunction with pixel timing clocks 'clkin', 'phase1in', and 'phase2in'. To start VBIU 102 operation, after providing the picture window and configuration parameters in VBIU 102's configuration registers, HBIU 113 brings the 'start' signal to logic high. VBIU 102 starts operations immediately after the 'start' signal is brought to logic high. Synchronization signals 'hsyncn' and 'vsyncn' are generated according to the screen size information; beginning of video horizontal lines are signalled by the negative edge of the 'hsyncn' signal. Otherwise, block video pixel data are obtained in the same manner as under the compression slave mode.

If the 'start' signal is brought to logic low after the start of the current video frame, VBIU 102 halts after completion of the current video frame. If the 'start' signal remains at logic high, however, VBIU 102 initiates processing of the next video frame upon completion of the current video frame.

Decompression Slave Mode

Under decompression slave mode, VBIU 102 video sequence data are provided to the external video equipment according to externally generated video synchronous signals 'hsyncn' and 'vsyncn' and pixel timing clocks 'clkin', 'phase1in', and 'phase2in'. Again, the picture window parameters are set by HBIU 113 by writing into VBIU 102's configuration registers. As in the compression slave and master modes, HBIU 113 brings the 'start' signal to logic high to start VBIU 102's operation.

At the first negative edge of 'vsyncn' signal after the 'start' signal is brought to logic high, VBIU 102 begins counting video horizontal lines using the negative edge of the 'hsyncn' signal. To send the decompressed video sequence data to the external video equipment, VBIU 102 must prepare the first eight horizontal lines of video data before the target window is reached; this is because the present embodiment provides the video data in 8×8 block video pixel data format. In order to meet the timing requirement, at least 8 lines before the top line of the target window, VBIU 102 must begin to process the first 8×8 block of the target window. When VBIU 102 gets the first decompressed data from block memory unit 103, the data is written into the external buffer memory, until the first 8 lines of decompressed data are stored.

When the video timing reaches the top left of the target window, VBIU 102 transfers the video sequence data from the external buffer memory to the external video equipment, and writes the first decompressed data of the next 8×8 block into the same addresses from which the last 8 lines of video sequence data are output to the external video equipment.

This operation is continued until the last 8 lines of decompressed data of the current target window are completely written into the external buffer memory.

If the 'start' signal is brought to logic low before the next negative edge of the 'vsyncn' signal, VBIU 102 halts the picture data of the current target window are completely processed. If the 'start' signal remains at logic high, VBIU 102 repeats the same operation for the next video frame in the manner described above.

Decompression Master Mode

Under decompression master mode, the synchronization signals 'hsyncn' and 'vsyncn' are generated by VBIU 102 according to the target screen parameters in VBIU 102's internal registers, as provided by HBIU 113. The decompressed video sequence data are sent to the external video equipment using these video synchronization signals together with pixel timing clocks 'clkin', 'phase1in', and 'phase2in'. HBIU 113 must bring the 'start' signal to logic high to initiate VBIU 102 operation.

When the 'start' signal is brought to logic high, operation starts immediately by the generation of synchronization signals 'hsyncn' and 'vsyncn' according to the window parameters. Video horizontal lines are counted by the negative edge of signal 'hsyncn'. Other than the generation on of synchronization signals, operation of VBIU 102 under decompression master mode is the same as the decompression slave mode.

A 'stall' signal may be brought to logic low by the external video equipment to halt VBIU 102's operation immediately. After 'stall' is brought back to logic high, VBIU 102 resumes its operation from the point where it is halted.

A 'blankn' signal is provided for monitoring external data transfer between the external video equipment and the external buffer memory under VBIU 102's direction. The 'blankn' signal is brought to logic high when data is being transferred between the external buffer memory and the external video equipment.

As described above, VBIU 102 must handle both video sequence data and 8×8 block video pixel data.

The VBIU 102 provides conversion of RGB 4:4:4 and RGBK 4:4:4:4 formats to YUV 4:4:4 and YUVK 4:4:4:4 formats respectively. (Note that component "K" is identical in RGBK and YUVK formats). In addition, YUV 4:4:4 and RGB 4:4:4 may also be reduced at the user's option, to YUV 4:2:2 format.

Figure 2:
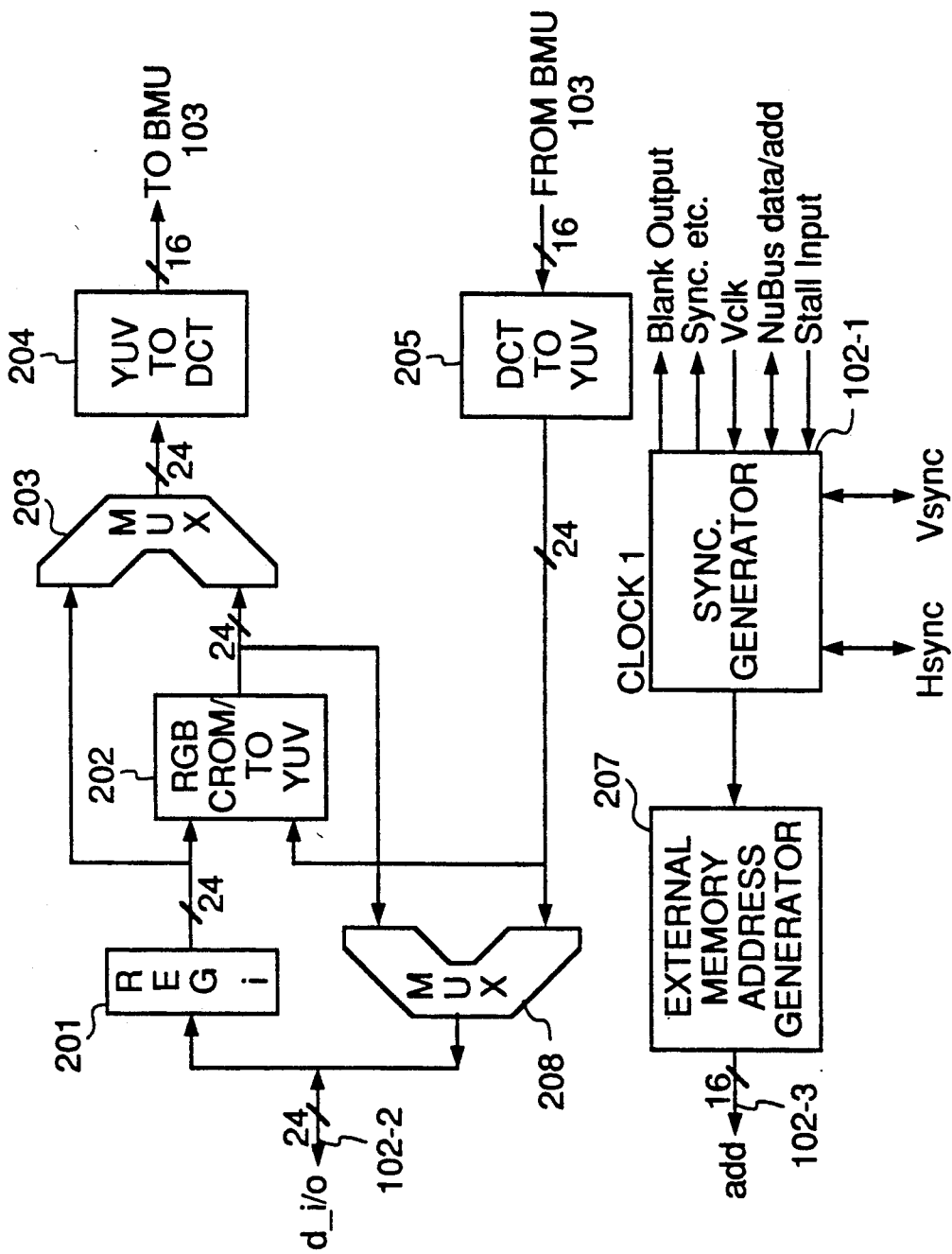
FIG. 2 shows a block diagram of the video bus controller unit 102 of the embodiment shown in FIG. 1.

FIG. 2 shows a block diagram representation of the VBIU 102 unit in this embodiment. As shown in FIG. 2, during compression, twenty four bits of input video data are provided to VBIU 102 and latched into register 201 from the external video equipment. Except for the bypass mode of operation, the input video data are taken from the 24-bit wide external buffer memory using the addresses provided by the external memory address generator 207 on address bus 102-3. As discussed above, if the input data is RGB or RGBK type data, the input data may be optionally converted into YUV or YUVK type data in the RGB/YUV converter 202. Either the input data in register 201 or the converted data in converter 202 are transferred through multiplexor 203 to YUV/DCT unit 204 to be forwarded to block memory unit 103, after accumulating each type of data into 16-bit values as described below.

Dependent upon whether "slave" or "master" mode is selected, hsynch and vsynch signals are provided to or received from the external video equipment.

YUV-to-DCT unit 204 packages the 24-bit input into 16-bit values each containing two 8-bit values of the same pixel component type. For example, in the YUV 4:1:1 data format, as shown under the heading "block storage input" in FIG. 3a, every two 8-bit values of the Y pixel component type are packaged into a 16-bit value every four pixel clock periods. Correspondingly, two 16-bit values each containing two 8-bit pixel component values of the U or V types are provided to block memory unit 103 every sixteen clock periods. FIG. 3a also shows that the output to block memory unit 103 is idled every four clock periods because of the smaller volume of data transferred under 4:1:1 data formats. This idling period results because the present embodiment is designed to be optimal under 4:2:2 data format.

FIG. 3b similarly shows that, under 4:2:2 data formats, a 16-bit value consisting of two 8-bit Y pixel component values are provided every four pixel clock periods to block memory unit 103. Another 16-bit value, also provided every four clock periods, consists of alternatively two 8-bit U or two 8-bit V pixel component type values.

The remaining sequences in which input video data received by the VBIU 102 unit are output to block memory unit 103 for the 4:4:4, 4:4:4:4 and bypass formats are shown respectively in FIGS. 3c, 3d and 3e.

During decompression, the decompressed data flow from the block memory unit 103 to the DCT-to-YUV unit 205 (FIG. 2) and are provided as up to twenty four bits output for the external video equipment in a manner substantially the reverse of the compression data flow.

Structure and Operation of Block Memory Unit 103

The block memory unit 103 in this embodiment has the same structure as disclosed in the above-mentioned copending application incorporated by reference above. As discussed above, for all formats other than bypass, the block memory unit (BMU) 103 sorts the stream of block video pixel data into 8×8 block data, each 8×8 block data block being sixty-four values of the same pixel component type. In the bypass/monochrome format, the input data are already in 8'8 block data format, so that no further sorting is necessary.

In addition, BMU 103 acts as a data buffer between the video bus interface unit (VBIU) 102 and the DCT input select unit 104 during data compression and, between VBIU 102 and DCT row/column separator unit 107, during decompression operations.

During compression, 16-bit data (two 8-bit values of the same pixel component type) arrive at the block memory unit 103, the data are sorted and accumulated in 64-value blocks, with each block being of the same pixel component type. BMU 103 then provide the accumulated data in 8×8 block format, and at two 8-bit values every two clock periods to the DCT units 104–107.

The sequence in which matrices each of one pixel component type are provided to the DCT input select unit 104 or received from the DCT row/column separator unit 107 varies with the pixel formats. In YUV 4:1:1 format, as shown in FIG. 3a, the sequence is YY---YYUV, which represents four 64-value blocks of Y type pixel component data and one block each of U and V types pixel component data. A "-" represents a period of 128 clock periods during which no data are sent to the DCT units 104–107. The sequences for other data formats are shown in FIGS. 3b–3e. As shown in FIG. 3b, under 4:2:2 data formats, the output sequence to the DCT units 104-107 is YYUVYYUV. Likewise, as shown in FIG. 3c, the output sequence data for 4:4:4 formats into the DCT units 104-107 is YUV-YUV-; in FIG. 3d, the sequence for 4:4:4:4 data formats is CMYKCMYK and for the bypass/monochrome format, shown in FIG. 3e, the output sequence to the DCT units 104-107 is the same as the input sequence to the block memory unit 103.

During decompression, data flow from the DCT units 104-107 into the block memory unit 103, but the data sequence with each associated data format is the same as during compression.

Structures and Operations of the DCT Units 104-107

The structures and operations of the DCT units 104-107 are described in the above-mentioned Copending Application.

Structure and Operation of Quantizer Unit 108

The structure and operation of the quantizer unit 108 are next described in conjunction with FIG. 4.

The quantizer unit 108 performs a multiplication on each element of the frequency matrix with a quantization constant or dequantization constant. This is a digital signal processing step which scales the various frequency components of the frequency matrix for further compression or decompression.

FIG. 4 shows a schematic block diagram of the quantizer unit 108.

During compression, a stream of 16-bit data arrive from the DCT row/column separator unit 107 via bus 418. Data can also be loaded under control of a host computer from the bus 426 which is part of the host bus 115. 2:1 multiplexor 404 selects a 16-bit datum per clock period from one of the busses 418 and 426, and place the datum on data bus 427.

During decompression, 11-bit data arrive from the zig-zag unit 109 via bus 419. Each 11-bit datum is shifted and scaled by barrel shifter 407 so as to form a 16-bit datum for decompression.

Dependent upon whether compression or decompression is performed, 2:1 multiplexor 408 selects either the output datum of the barrel shifter 407 (during decompression) or the output datum on bus 427 (during compression). The 16-bit datum thus selected by multiplexor 408 and output on bus 420 is latched into register 411, which stores the datum as an input operand to multiplier 412. The other input operand to multiplier 412 is stored in register 410, which contains the quantization (compression) or dequantization (decompression) coefficient read from YU_tables 108-1a or 108-1b, discussed in the following.

Address generator 402 generates addresses for retrieving the quantization or dequantization coefficients from the YU_tables 108-1a and 108-1b, according to the pixel component type, the position of the input datum in the 8×8 frequency matrix and the content of the configuration registers 401a and 401b. The configuration register 401, consisting of registers 401a, 401b and 401c, provides the information of the data format being received at the VBIU 102, to provide proper synchronization with each incoming datum.

The YU_tables 108-1a and 108-1b are two static random access memory (SRAM) arrays containing four tables, each table organized as 64×16 bits. The SRAM arrays 108-1a and 108-1b are each 64×16×2 bits. That is, four 64-value quantization or dequantization matrices are contained in these SRAM arrays 108-1a and 108-1b, with each element being 16-bit wide. During compression, the YU-tables 108-1a and 108-1b contain four quantization tables, each table containing 64 16-bit quantization coefficients. Except in video mode, the quantizer 108 is programmed to select any one of the four tables in accordance with the pixel component type of the matrix. In video mode, a rate control mechanism, to be described below, allows compression ratios to be changed on a frame-by-frame basis using four quantization tables divided into two sets (each set containing two tables), with each set of table designed to provide a different compression ratio. If double buffering is activated in the quantizer unit 108's configuration register, when two tables are actively used for quantization, the other two tables may be loaded through the host bus interface 113; this feature allows two or more sets of quantization tables to be used alternatively to achieve varying compression ratios. Otherwise, the two sets of quantization tables, providing two ratios of compression, are loaded before compression operation begins.

Each quantization or dequantization coefficient is applied specifically to a corresponding element in the frequency matrix and data of some pixel component types may share the same set of quantization or dequantization coefficients. For example, in one embodiment, the U and V pixel component types (chrominance) of the YUV data formats share the same quantization and dequantization matrices. The YU_tables 108-1a and 108-1b are also accessible for read or write directly by a host computer via the bus 435, which is also part of the host bus 115. When the host bus access the quantization tables 108-1a and 108-1b, the external address bus 425 contains the 7-bit address (addressing any of the 128 entries in the two 64-coefficient tables), and data bus 435 contains the 16-bit quantization or dequantization coefficients. 2:1 multiplexors 403a and 403b selects whether the memory access is by an internally generated address (generated by address generator 402) or by an externally provided address on bus 425 (also part of bus 115) at the request of the host computer.

Quantization or dequantization coefficients are read into the registers 406a and 406b. 2:1 multiplexor 414 selects the content of either register 406a or register 406b for output on bus 431. 2:1 multiplexor 409 selects whether, during compression, the entire sixteen bits on bus 431 is provided to the multiplier operand register 410, or, during decompression, have the datum's most significant bit (bit 15) and the two least significant bits (bits 0 and 1) set to 0. The bits 15 to 13 of the dequantization coefficients (during decompression) are supplied to the barrel shifter 407 to provide scaling of the operand coming in from bus 419. By encoding a scaling factor in the dequantization coefficient the dynamic range of dequantized data is expanded, just as in a floating point number representation.

Multiplier 412 multiplies the operands in operand registers 410 and 411 and, after rounding at bit 15 (i.e. adding a 1 at bit 14), retains the sixteen next most significant bits of the 32-bit result in register 413 beginning at bit 30. This 16-bit representation is determined empirically to be sufficient to substantially represent the dynamic range of the multiplication results. In this embodiment, multiplier 412 is implemented as a 2-stage pipelined multiplier, so that a 16-bit multiplication operation takes two clock periods, and a result is made available at every clock period.

The 16-bit datum in result register 415 can be sampled by the host computer via the host bus 423. During compression, only the lower eleven bits of the result in register 415 are forwarded to the zig-zag unit 109. Alternatively, during decompression, the entire 16-bit result in register 415 is provided on bus 422 after being amplified by bus driver 416.

As discussed above, the quantization or dequantization tables are stored in two $64 \times 16 \times 2$ SRAM arrays. The SRAM arrays are selected for reading according to the table sequence corresponding to the format of the data being processed. Up to ten table sequences may be programmed. A table sequence is the order in which quantization tables are loaded and read, e.g. in the CMYK 4:4:4:4 format, four quantization tables will be loaded, such that the quantization coefficients for all pixel component types are resident and the specific table is pointed to according to the pixel component type of each $8 \times 8$ block. A 4-bit resetable counter, capable of counting in cycles of 6, 7, 8, 9, or 10, is provided to direct the loading and selection of quantization tables. The length of the count cycle is determined by three bits stored in configuration register 401c.

During compression, the data arriving on bus 418 and the corresponding quantizer coefficients read from the corresponding quantization tables pointed to in the YU tables 108-1a or 108-1b are synchronously loaded into registers 411 and 410 as operands for multiplier 412. For each datum, after two clock periods in the multiplier 412, the bits 30 to 15 forming the 16-bit result from the multiplication operation (after rounding by adding a 1 at bit 14), are available and are latched into result registers 415. The lower eleven bits of this 16-bit result are the output of the quantization step during compression.

Alternatively, during decompression, the 16-bit result in register 415 is provided in toto to the DCT input select unit 104 for IDCT on bus 422.

During decompression, data arrive from zig-zag unit 109 on bus 419. To perform the proper scaling for dequantization, barrel shifter 407 appends four zeroes to the 11-bit datum received from zig-zag unit 109, and sign-extends the most significant bit by one bit to produce an intermediate 16-bit result. (This is equivalent to multiplying the datum received from the zig-zag unit 109 by sixteen). Using the scaling factor encoded in the dequantization coefficient, as discussed earlier in this section, this 16-bit intermediate result is then shifted by the number of bits indicated by bits 15 to 13 of the corresponding 16-bit dequantization coefficient. The shifted result from the barrel shifter 407 is loaded into register 411, as an operand to the $16 \times 16$ bit multiplication.

The 16-bit dequantization constant is read from either YU_table 108-1a or YU_table 108-1b into register 406. The first three bits 15 to 13 direct the number of bits to shift the 16-bit intermediate result in the barrel shifter 407, as previously discussed. The thirteen bits 12 through 0 of the dequantization coefficient form the bits 14 to 2 of the operand in register 410 to be multiplied to the datum in register 411. The other bits of the operand in register Just as in the compression case, the sixteen bits 30 to 15 of the 32-bit result of the multiplication operation on the operands in registers 410 and 411 are loaded, after rounding at bit 15, into register 415. Unlike compression, however, the entire sixteen bits of register 415 are supplied to the DCT input select unit 104 on bus 422 through buffer 416. In real time operation, called video mode, in which pixel data must be sent or received at a specified rate, compression and decompression must be accomplished at the rate data are supplied or required. As mentioned above, during compression, data awaiting Huffman-coding are stored in the FIFO memory 114 (see FIG. 1). During compression, data ready to be read by the coder unit 111a are stored in the FIFO memory 114, which must be prevented from overflowing. During decompression, underflowing (i.e. empty) of the FIFO memory 114 must be avoided to sustain decompression at the rate data are required.

In this embodiment, at low compression rates, the decoder 111b may not be able to supply decoded data to the zero packer/unpacker 110 at a high enough rate to prevent FIFO 114 from becoming empty (underflow). In order to prevent underflowing during decompression, three levels of adaptive control are provided during compression to ensure underflow will not occur during decompression. The first level of adaptive control is provided in quantizer 108 by using different sets of quantization tables according to the capacity of the FIFO memory 114, as provided by the status signals of the FIFO memory. The FIFO memory 114 provides status signals to indicate "full", "three-quarters full", "half-full", and "empty". A set of pointers in configuration registers 401c indicate the quantization tables in use. A second level of adaptive control is provided in the zero packer/unpacker unit 110, to be discussed in a later section. A third level of control is provided at the "chip" level, also to be described in a later section.

Figure 4B:
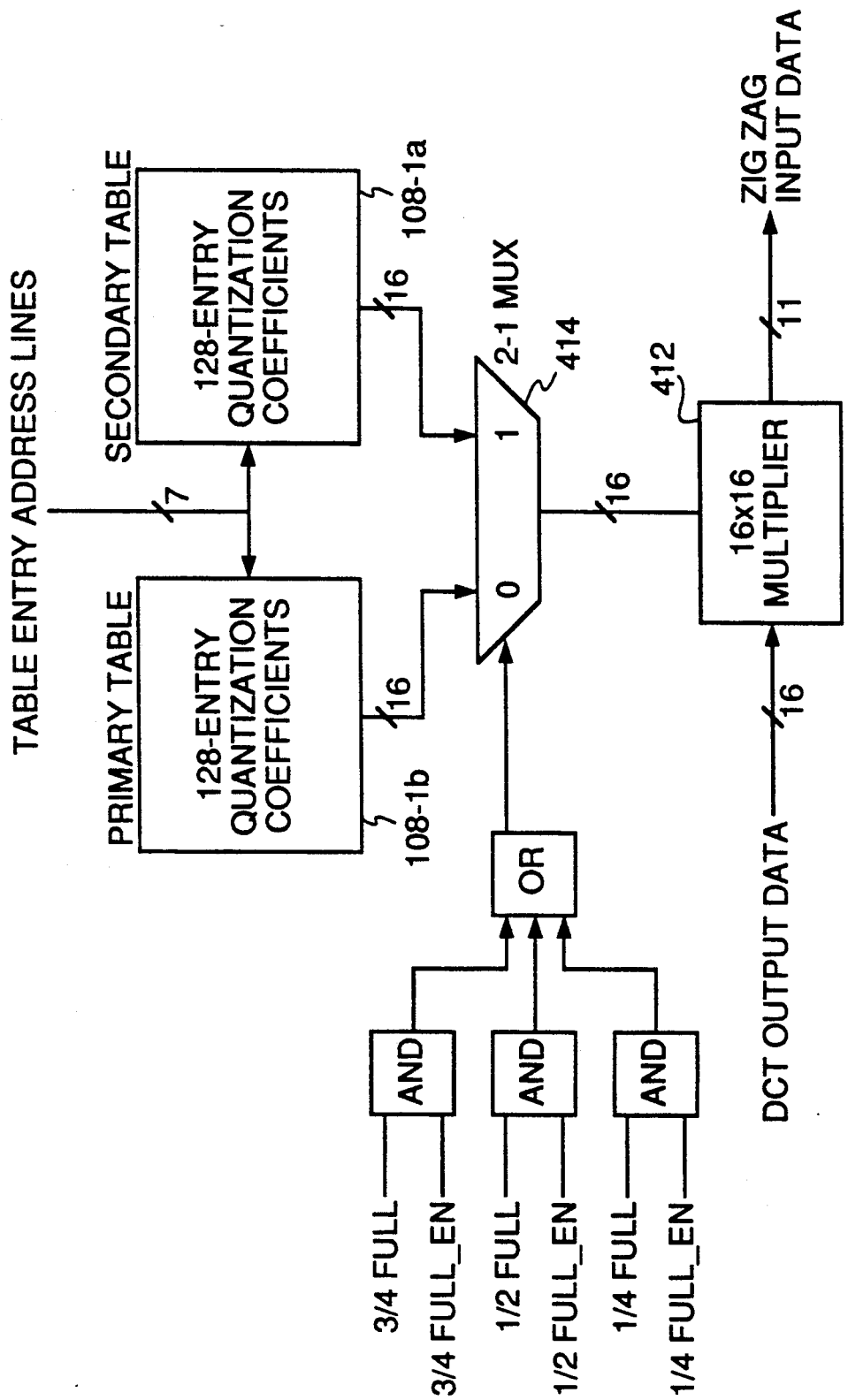
FIG. 4b is a block diagram of the first level adaptive compression rate control system at the quantizer unit 108.

Under video mode, two sets (first and second) of quantization tables, each set having two tables, are loaded into the SRAM arrays 108-1a and 108-1b, with each set of quantization tables having a different expected compression ratio. A set of pointers in configuration registers 401c indicate the two quantization tables in use. A programmable threshold, such as signalled by the "three-quarters full" status signal, may be used to initiate adaptive rate control. FIG. 4b shows in block diagram form the rate control mechanism. Before the preset threshold value is reached, compression is accomplished using a first set of tables, such as stored in 108-1b in FIG. 4b, which compression ratios are chosen for the desired play-back image quality. Once the preset threshold is reached, higher compression ratio using the secondary tables stored in 108-1a may be necessary to prevent overflow of the FIFO memory 114. The pointers in configuration registers 401c are switched to point to the second set of quantization tables in 108-1a, chosen to have a higher expected compression ratio. Because of the higher compression ratios, the second set of quantization coefficients will create longer runs of zero, thereby filling the FIFO memory 114 at a slower rate than the first set. As the data in the FIFO memory 114 are read by coder 111a, when the FIFO memory 114 falls below another preset threshold of the used capacity of the FIFO, such as "half-full", the pointers in the configuration register 401c are switched back to point to the first set of quantization tables.

In this embodiment, each set of quantization tables contains one table for Y pixel component type (luminance) and one table for both U and V (chrominance) pixel component types, when YUV data formats are used. Switching tables is only allowed at block boundaries, so that each matrix is always completely quantized by one set of quantization tables.

Since the quantization tables selected for the present data being processed reside in only one of the two SRAM arrays 108-1a and 108-1b, the other SRAM array containing quantization tables not selected may be written into or read concurrently by the host over the host bus 115.

Structure and Operation of the Zig-Zag Unit

The structure and operation of the zig-zag unit 109 are described in the above-mentioned copending application incorporated by reference. The width of each datum supplied to the zig-zag unit 109 in this embodiment is 11-bit.

Structure and Operation of the Zero-packer/unpacker Unit 110

Figure 5A:
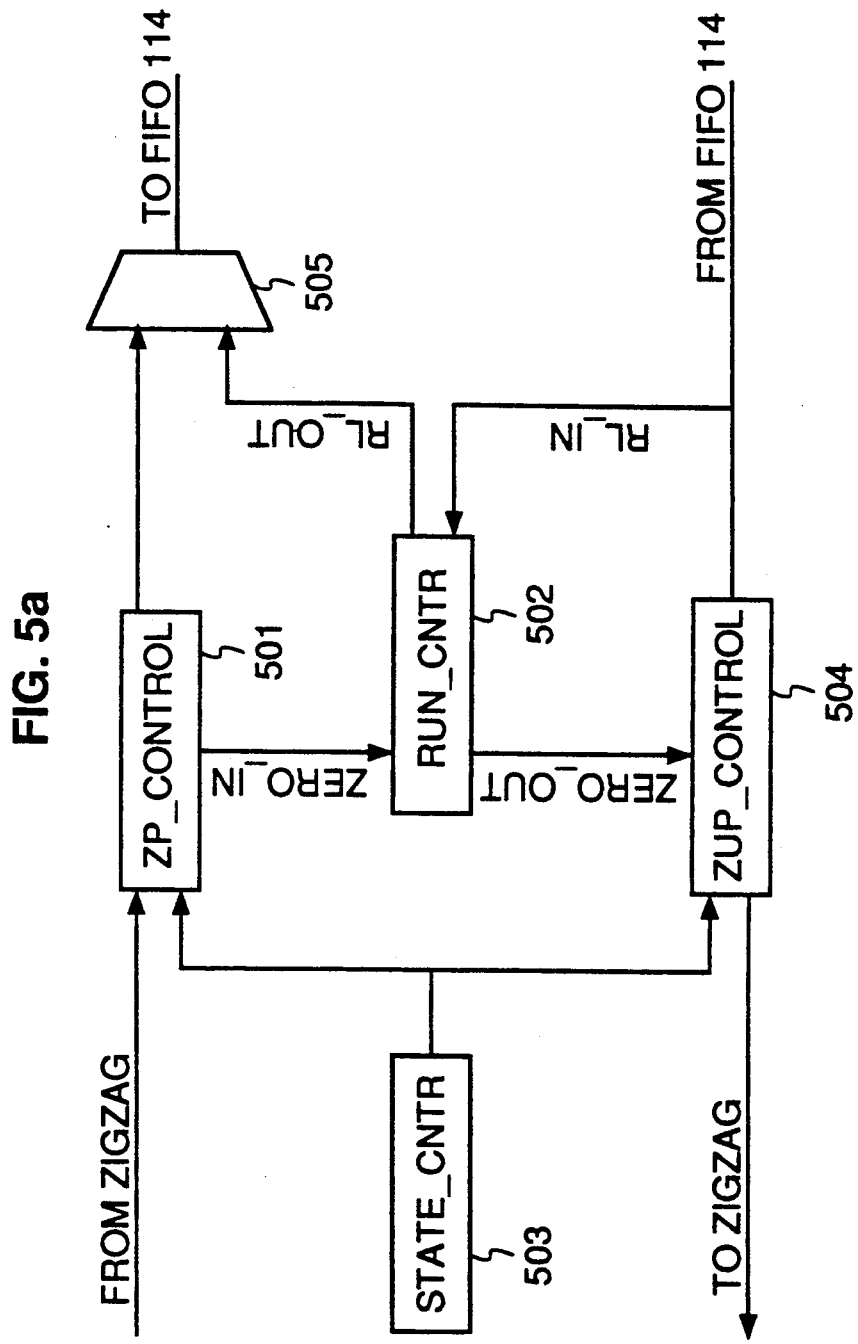
FIG. 5a shows a schematic block diagram of the zero packer/unpacker unit 110 in the embodiment shown in FIG. 1.

The structure and operation of the zero packer/unpacker unit (ZPZU) 110 (FIG. 1) are next described in conjunction with FIG. 5a. FIG. 5a shows in block diagram form the functional circuitry of ZPZU 110 used for zero packing and unpacking.

The ZPZU 110 consists functionally of a zero packer and a zero unpacker. The function of the zero packer is to compress consecutive values of zero into the representation of a run length. The advantage of using run length data is the enormous reduction of storage space requirement due to many values in the frequency matrix being reduced to zero during the quantization process. Reduction in data storage by five times is achievable by the run length representation. The zero unpacker provides the reverse operation of the zero packer.

A block diagram of the ZPZU unit 110 is shown in FIG. 5a. As shown in FIG. 5a, the ZPZU 110 includes a state counter 503, a run counter 502, the ZP control logic 501, a ZUP control logic 504 and a multiplexor 505. The state counter 503 contains state information such as the mode of operation, e.g., compression or decompression, and the position of the current element in the frequency matrix. A datum from the zig-zag unit 109 is first examined by ZP control 501 for zero value and passed to the FIFO memory 114 through the multiplexor 505 if the datum is non-zero. Alternatively, if a value of zero is encountered, the run counter 502 keeps a count of the zero values which follow the first zero detected and output the length of zeroes to the FIFO memory 114 when the next non-zero value is received. The number of zeros in a run length is a function of both the image information contained in the pixel matrix, and the quantization tables. If the pixel matrix corresponds to an image in an area where very little intensity and color fluctuations occur, longer runlengths of zeros are expected than for an image over an area where such fluctuations are greater.

During decompression, data are read from the FIFO memory 114 via the ZUP-control unit 504 and then forwarded to the zig-zag unit 109. If a run length is read during decompression, the run length is unpacked to a string of zeroes which length corresponds to the run length read and the output string of zeroes is forwarded to the zig-zag unit 109.

There are four types of data that the zero packer/unpacker unit 110 will handle, i.e. DC, AC, RL and EOB. The zero packer/unpacker unit 110 outputs a 13-bit datum during compression; the two significant bits encoding the data type (i.e., DC, AC, RL, or EOB) followed by an 11-bit signed datum. For the DC and AC values, the 11-bit datum is the 11-bit value viewed from the zig-zag unit 109. Conventions and the design of the zero packer/unpacker 110 require that a run length is not to be followed by another run length. Hence, the maximum run length will be 62, corresponding to the situation in which a matrix is represented by a DC value the run length of sixty two, and a non-zero AC value. This is because (i) the DC value is always expressed, even if it is zero, and (ii) if the last AC value is zero, it is not expressed as a run length but an EOB is found in its place.

During compression, as ZP_control 501 receives the first element (DC) of a frequency matrix from zig-zag unit 109, the 11-bit value is passed directly to the FIFO Memory 114 regardless of whether its value is zero or not. Thereafter, if a non-zero element in the frequency matrix is received by ZP control 501, it is an AC datum and the 11-bit value is passed after the last run length to the FIFO Memory 114. When a zero-value element of the frequency matrix is received after a non-zero DC or AC element, the run length counter 502 will be initialized to count the number of zero elements following, until the next non-zero element of the frequency matrix is encountered. The count of zeroes is forwarded to the FIFO Memory 114 in a run length (RUN) representation. If there is not another non-zero element in the remainder of the frequency matrix, instead of the run length, an EOB (end of block) code is output. After every run length or EOB code is output, the run counter 502 is reset for receiving the next burst of zeroes. For example, if the only non-zero values of a bit-value block are the DC value, the third and sixteenth values, then the encoding of the block will be, in order, the DC value, run length of 1, the third AC value, run length of 12, the sixteenth value and EOB.

During decompression, the ZUP_control unit 504 reads decoded data from the FIFO Memory 114. As a DC or an AC datum is encountered by the ZUP control unit 504, the 11-bit datum will be passed to the zig-zag unit 109. However, if a run length datum is encountered, the value of the run length count will be loaded into the run length counter 502, zeroes will be output to the zig-zag unit 109 as the counter is decremented until it reaches zero. If an EOB datum is encountered, the ZUP control unit 504 will automatically output zeroes until the 64th element, corresponding to the last element of the frequency matrix, is output.

Figure 5B:
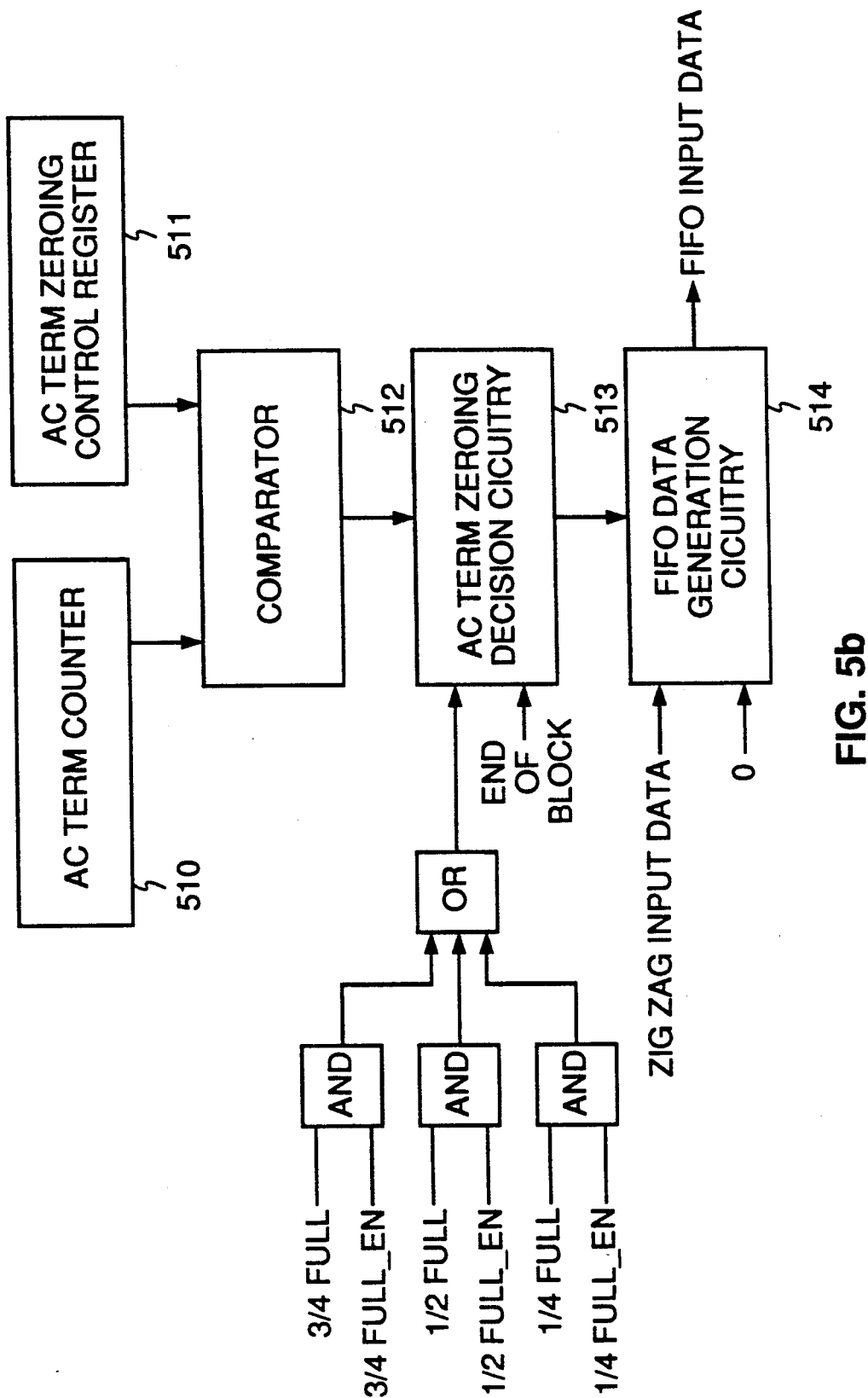
FIG. 5b is a block diagram the second level adaptive compression rate control system at the zero packer/zero unpacker unit 110.

As mentioned in the previous section, which describes the structure of quantizer 108, during compression, a second level of adaptive rate control is implemented in the zero packer/unpacker unit 110, so as to prevent underflow of the FIFO memory 114 during decompression. This second level of adaptive rate control is now described in conjunction with FIG. 5b. FIG. 5b shows in block diagram form the circuits used in this adaptive rate control mechanism.

Because of the latency between the time when the quantized data are provided at the output of quantizer 108 to the time the data reach the FIFO memory 114 (i.e. through zig-zag unit 109 and Zero packer/unpacker unit 110), FIFO memory 114 may still overflow despite quantization tables of higher compression ratios are used in the first level of rate control. A second adaptive rate control mechanism is therefore provided in the zero packer/unpacker 110. Since the zero packer/unpacker 110 is the immediate functional unit prior to data being stored in FIFO memory 114, control at the zero packer/unpacker 11? takes effect more immediately than the first level rate control at quantizer 108. In this embodiment, the user may select to enable either the adaptive flow control mechanism at the quantizer 108, or the mechanism at the zero packer/unpacker 110, or both.

During video mode, when a preset level of use in FIFO memory use 114 is detected, such as "three-quarters full", the rate control mechanism is activated to retain the values of only a programmable number of elements in the frequency matrix and to force the remaining elements of the frequency matrix to become zero (by sending an EOB). The number of elements in the frequency matrix which values are to be retained is stored in the control register 511. In the zero packer/unpacker unit 110, the position in the frequency matrix of the present AC term is kept in the AC term counter 512. When comparator 512 detects that the present position exceeds the number of elements which values are to be retained, and the preset usage threshold of the FIFO memory 114 is also exceeded, the decision circuitry 513 will direct the FIFO data output circuitry 514 that an EOB be output to the FIFO memory 114. For example, if the number specified in control register 511 of elements in the frequency matrix which values are to be retained is four, only the DC term and lowest four AC terms are passed when the preset usage of the FIFO memory 114, such as three-quarters full, is exceeded; the remaining fifty-nine AC terms are expressed as a runlength of fifty-nine zeroes by the 13-bit EOB code.

This method of forcing the high frequency AC components to zero is effective, at the expense of image quality, to prevent an overflow of the FIFO memory 114. The AC terms that are set to zero represent information loss. The user may specify a higher number of AC terms to be retained, according to the image quality deemed acceptable for the application.

Structure and Operation of the Coder/Decoder Unit 111

The structure and operation of the coder/decoder unit 111 (FIG. 1) are next described in conjunction with FIGS. 6a and 6b.

The coder unit 111a directs encoding of the data in runlength representation into Huffman codes. The decoder unit 111b provides the reverse operation.

During compression, in order to achieve a high compression ratio, the coder unit 111a of the coder/decoder unit 111 provides the translation of zero-packed DCT data stored in the FIFO memory 114 into a variable length Huffman code representation. The coder unit 111a provides the Huffman-coded DCT data sixteen bits at a time to Host Bus Interface Unit (HBIU) 113, which in turn transmits the Huffman encoded data thirty-two bits at a time to an external host computer.

During decompression, the decoder unit 111b of the coder/decoder unit 111 receives Huffman-coded data from the HBIU 113, and provides the translation of the variable length Huffman-coded data into zero-packed representation for the decompression operation.

The Coder Unit 111a

FIG. 6a is a block diagram for the coder unit 111a of FIG. 1.

During compression, the "pop-req" ("pop" request) signal is asserted by the coder 111a when the coder 111a is ready for the next datum. When the FIFO memory 114 makes available a datum on the 13-bit "fifodata" bus 505, type-code unit 501 checks the most significant two bits to determine whether the datum received is a DC, an AC, a runlength or an EOB datum. If the datum received is a DC, a non-zero AC or EOB type datum, address generator 502 generates an address into the Huffman code tables 117 for the Huffman code corresponding to the received value. If the datum received is a runlength, then the next value, which is an AC value, is requested and combined by the address generator 502 with the previous runlength term to form the address into Huffman code table 117. The address formed by address generator 502 is placed on 10-bit haddr bus 503 and the signal "loadtbl" is asserted logic high. The Huffman code is returned on the 18-bit huffcode bus 504. The Huffman tables 117 are divided into AC and DC codes. An address into Huffman tables 117 is composed of the fields: "table" (1 bit), "AC or DC" (1 bit), "runlength" (4 bits), and "group" (4 bits). The "table" bit identifies which of the two Huffman tables in Huffman tables 117 is selected. The "AC or DC" field indicates whether AC or DC codes are to be used. The "runlength" field is the number of zeroes received preceding the immediate non-zero AC term, and the "group" field contains the number of significant bits in the AC or DC value (i.e. coefficient) to follow. For coding purposes, an EOB value received is coded as a zero runlength preceding a zero AC value.

As mentioned above, the zero packer/unpacker unit 110 will code a maximum runlength of 62. However, the JPEG standard allows only a maximum runlength of fifteen in its specified data representation. Hence, the runlength module 506 is designed to recognize a runlength larger than fifteen and replace it with an equivalent representation under the JPEG standard. For example, if a runlength of seventeen preceding an AC value of 20 is received, the runlength module 506 will code the received value as a runlength of fifteen preceding an AC value of zero, then followed by a runlength of one preceding the AC value of 20. Two Huffman addresses will then be formed in the address generator 502.

The groupgen module 509 evaluates each DC or AC value received to determine the number of significant bits in the DC or AC value ("group"). In this embodiment, DC data received from the zero packer/unpacker unit 110 is not directly used to generate the group value; rather, the 12-bit difference between the previous DC value received and the current DC value is used to encode the group information.

DPCM (differentiated pulse code modulation) module 511 provides the difference between the current DC value and the last DC value, and stores the current DC value for the next 64-value block. Limiter 510 limits all input into the range between $-1023$ and $+1023$, by setting $-1024$ to $-1023$, so that all DC groups will have 1 to 11 significant bits. The 11-bit DC group occurs, for example, when a $-1023$ DC value is followed by a $+1023$ DC value, resulting a difference of $+2046$ which has eleven significant bits.

The Huffman code received from the Huffman tables 117 on the 18-bit huffcode bus may be one to sixteen bits long. The Huffman code is designed such that length information of the code is embedded in the most significant five bits. An 18-bit code, for example, will be represented by "10" followed by the 16-bit code, where the leading 2 bits "10" conveys the information that the total code length is eighteen. The module codelength 507 is designed to extract this information to direct accumulation of the variable length Huffman code to be transmitted to the host computer. Bitlength module 508 keep tracks of the total length of the Huffman codes accumulated for transmission to the host computer.

There are two Huffman tables in Huffman table module 117, each corresponding to one or more pixel component types.

The Huffman tables 117 are shared between the coder 111a, the decoder 111b, and the internal host bus 115, which loads the contents of Huffman tables 117 under the direction of the external host computer.

The Huffman codes returned on huffcode bus 504 are forwarded with the level data to bit-concatenation module 512 for the creation of a bit stream of Huffman-coded data. Data are then transferred in 8-bit words to byte-concatenation unit 513, which in turn transfers the Huffman coded data, two bytes at a time, to the host interface unit 113.

The bit-concatenation module 512 always contains less than eight bits of data before concatenating a received Huffman code or level datum to the coded bit-stream. If the resulting number of data bits exceeds eight bits after concatenation of a new datum in the bit-concatenation module 512, the oldest bytes are transferred to the byte-concatenation unit 513. Hence, the maximum code length in the bit-concatenation unit 512 is 23, corresponding to a 16-bit (lowest) Huffman code appended to the seven bits left from the previous transfer.

The bit-concatenation module 512 can be forced by the host computer to pad "1"s in order to make the current bits in the bit-concatenation module 512 become eight bits (byte boundary), to force a transfer to the byte-concatenation module 573. This condition is encountered when a resync code (for resynchronization) is needed in the bit-stream sent to the host computer, as discussed below.

The byte-concatenation modules 513 holds bytes transferred from the bit-concatenation module 512, and also provides a '00 byte to follow, when a 'FF (Hexadecimal) value is detected. The 'FF00 double-byte is used to distinguish the first ('FF) byte of data from resync codes, each of which takes the form of 'FFDx, where x is a value between 0 and 7.

The resync codes are provided to mark the boundaries of minimum data units. For example, if a marker code is to be inserted every five minimum data units, and each minimum data unit is the four blocks, then a resync code is added every twenty blocks, in cycles of 'FFD0 to 'FFD7.

The Decoder Unit 111b

The structure of the decoder unit 111b of the coder/decoder unit 111 (FIG. 1) is shown in block diagram form in FIG. 6b.

The decoding scheme follows a standard established by JPEG, and is described in the above-mentioned copending application incorporated by reference.

During decompression, thirty-two bits of data at a time are transferred from the Host Bus Interface Unit 113 into the 32-bit register 601 of decoder 111b. A marker code detector 602 recognizes and strips marker code information from the compressed data, as marker codes are not used in decoding.

The data stripped of the marker codes are then made available for decoding two bits at a time.

Each 2-bit datum received is sent to the next address generator 604. An 18-bit wide static random access memory array is provided in the Huffman Code tables 117 for storing coding and decoding tables. The 18-bit width allows the longest Huffman code for this embodiment to reside completely in one entry of the Huffman code tables 117. During decoding, however, the returned word is designed to be 9-bit wide. Each 9-bit word contains either data, which require no further decode in the Huffman tables 117, or a branch address in the Huffman tables 117 which requires access to another location (i.e. an indirection) in the Huffman tables 117 for the required data. Some codes may require several levels of indirection.

Because the SRAM array in Huffman code tables 117 is 18-bits wide, each 18-bit word contains two 9-bit words when used in decoding. The least significant bit of the 11-bit address to the decode tables determines whether the left or right 9-bit datum is selected.

The decoded datum is of variable length, consisting of either a "level" datum, a DC code, a runlength-AC code, or EOB. A level datum is the significant bits of either AC or DC values, as discussed in the previous section in conjunction with the coder 111a. The runlength-AC code consists of a AC group field and a run length field. The AC group field of the runlength-AC code contains a 4-bit group number, which is decoded in the run length/group detector 605 for the number of the significant bits in the level datum to follow. The level datum is then shifted into the level-data shift register 606, according to the number of bits encoded in the AC group field, to restore the decoded value.

If the first bit or both bits of the 2-bit datum received is "level" data, i.e. significant index of the AC or DC value, the decoding is postponed until the next two bits of Huffman code is received. That is, if the first bit of the 2-bit datum is "level" and the second bit of the 2-bit datum is Huffman code, then the next 2-bit datum will be read from HBIU 113, and decoding will proceed using the second bit of the first 2-bit datum, and the first bit of the second 2-bit datum. Decoding is accomplished by looking up one of the two Huffman decode tables in Huffman table 117. The next address generator 604 provides the Huffman table 117 an 11-bit address for the next entry in the decoding table t-o look up. The returned Huffman decode table entry which is a 9-bit word is stored in the table data buffer 607. If the datum looked up indicates that further decoding is necessary (i.e. having the "code_done" bit set "0" as detected by code-done-detector 609), the 8-bit "next address" field of the 9-bit datum is combined with the next 2-bit datum input from the HBIU 113 and the table bit to generate the 11-bit address for the next Huffman decode table entry.

In this embodiment, the second bit of the 2-bit datum received from the host bus interface unit 113 forms the least significant bit of the 11-bit address. This least significant bit is provided to the SRAM array implementing Huffman tables 117 to select the left or right 9-bit word out of the 18-bit word stored in the table data buffer 607, as output from the SRAM array, unless the left and right 9-bit data in the SRAM array are identical (see below).

When the "code_done" bit is set "1", it indicates the current datum contains a 4-bit runlength and 4-bit AC group number. Since two bits of Huffman code are provided at a time for decoding, a situation may arise in which only the first of the two bits of the Huffman code is needed for decoding and the second bit of the two bits is actually the first bit of the level datum to follow, or the first bit of the next Huffman code. In that situation, the two 9-bit data read from the 18-bit word of the addressed memory location in SRAM array 117 are identical. This condition is detected by the Code odd- /even comparator 609 which signals the 2_bit_data_ generator 603 and the level_data shift register 606 to ensure proper handling of the next data bits to follow. The AC group number is used to determine the bit-length and magnitude of the level data to be received in the level-data shift register 606. The level generator 610 takes the level datum and provides the fully decoded datum, which is forwarded to the FIFO memory 114, through the FIFO push control unit 611.

The DC/AC counter 612 keeps a count of the data decoded to keep track of the datum type and position in the frequency matrix of the datum being decoded, i.e. whether the current datum being decoded is an AC or a DC value, the datum's position in the frequency matrix, and whether the current block is of Y, U or V pixel component type. The runlength register 613 is used to generate the zero-packed representation of the run length derived from the Huffman decode table. Because the DC level encodes a difference between the previous DC value with the current DC value, the 1-D DC predication and registers 614 derives the actual DC level by adding the difference value to the stored previous DC value. The derived DC value is then updated and stored in 1-D DC prediction and registers 614 for computing the next DC value.

The decoded DC, AC or runlength data are written into the FIFO memory 114 through the FIFO push control 611 for the zero packer/unpacker 110, to be read for unpacking.

Structure and Operation of the Host Bus Interface Unit 113

The structure and operation of the host bus interface unit 113 is described in the above-mentioned copending application incorporated by reference.

Third Level Adaptive Rate Control

Figure 7:
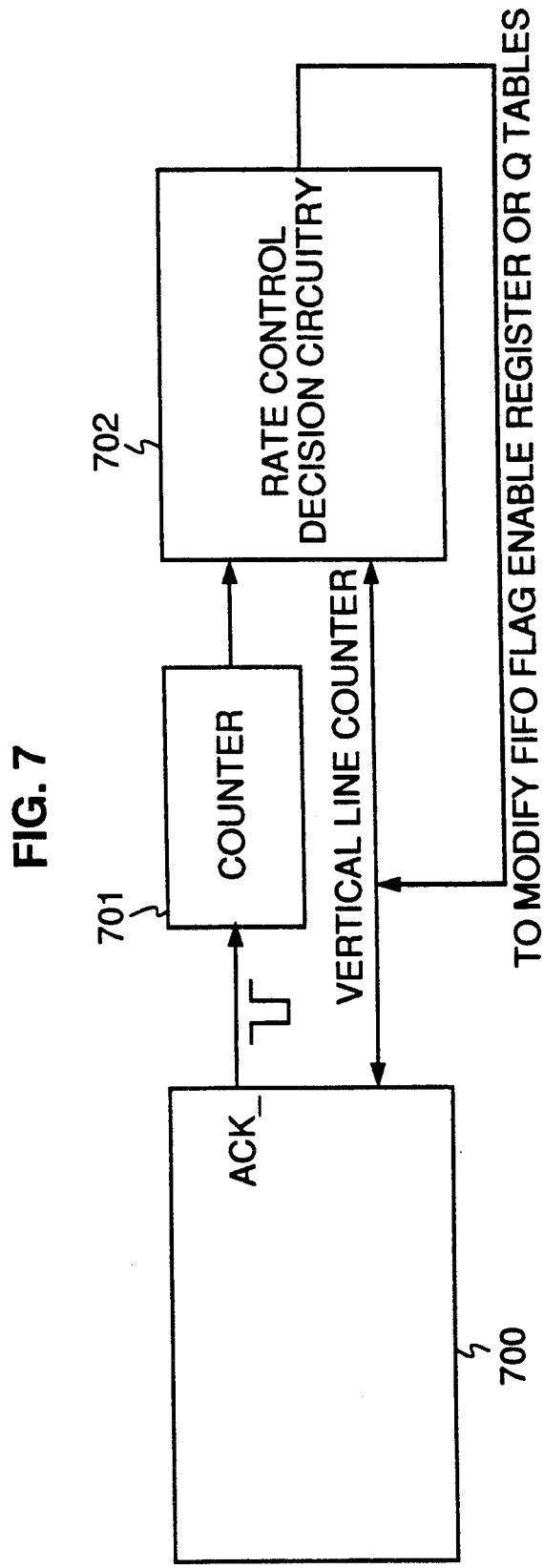
FIG. 7 is a block diagram of the third level compression rate control system at the "chip" level.

A third level of adaptive compression rate control may be provided external to the integrated circuit chip of the present embodiment. This level of adaptive rate control mechanism is represented in block diagram form in FIG. 7. In FIG. 7, the compression and decompression signal processing functions are represented in the "chip" 700. An external counter 701 monitors the accumulated size of the compressed data from the beginning of the video frame. Rate control decision circuitry 702 compares at preset check points within the video frame, the size of the accumulated compressed data against the size of the image scanned, such as represented by the number of horizontal lines scanned. If the accumulated size of compressed data exceeds an expected value for that check point, relative to the size of the video frame, rate control decision circuitry 702 will effectuate corrective action, such as enabling the first or second level of adaptive control described above.

The above detailed description is intended to be exemplary and not limiting. To the person skilled in the art, the above discussion will suggest many variations and modifications within the scope of the present invention, as defined by the following claims.

We claim:

1. A system for data compression and decompression, comprising:

video interface means for receiving and transmitting digitized images as a stream of composite pixels, each composite pixel being represented by data of a plurality of chrominance and luminance component types;

block memory means for receiving and sorting, during data compression, said stream of composite pixels from said video interface means into single-component type data blocks, and for receiving and reconstituting, during data decompression, single-component type data blocks into said stream of composite pixels;

discrete cosine transform means for performing, during data compression, a 2-dimensional discrete cosine transform on single-component type data blocks received from said block memory, and providing coefficients of said 2-dimensional discrete cosine transform, and for performing, during data decompression, a 2-dimensional inverse discrete cosine transform, and providing as output data said coefficients of said 2-dimensional inverse discrete cosine transform to said block memory means as single-component type data blocks;

quantization means for attenuating, during data compression, higher frequency coefficients of said 2-dimensional discrete cosine transform, and for partially restoring, during data decompression, said higher frequency coefficients of said 2-dimensional discrete cosine transform, in preparation for said 2-dimensional inverse discrete cosine transform;

zig-zag means for rearranging, during data compression, said coefficients of said 2-dimensional discrete cosine transform from "sequential" order into "zig-zag" order, and for rearranging, during data decompression, said zig-zag ordered coefficients of said 2-dimensional discrete cosine transform from a "zig-zag" order to a "sequential" order;

data packing and unpacking means for packing, during data compression, said "zig-zag" ordered coefficients of said 2-dimensional discrete cosine transform as run length-represented coefficients of said 2-dimensional discrete cosine transform, and for unpacking, during data compression, said run length-represented coefficients of said 2-dimensional discrete cosine transform to said "zig-zag" ordered coefficients of said 2-dimensional discrete cosine transform;

Huffman coding/decoding means for coding, during data compression, said run length-represented coefficients of said 2-dimensional discrete cosine transform into Huffman Codes, and for decoding, during data compression, said Huffman codes into said run length-represented coefficients of said 2-dimensional discrete cosine transform;

first-in first-out memory means for temporary storage of said run length represented coefficients of said 2-dimensional discrete cosine transform such that said Huffman coding/decoding means operates asynchronously and independent of said data packing and unpacking means; and host interface means for transmitting, during data compression, said Huffman codes to a host computer, and for retrieving, during data decompression, said Huffman codes from a host computer.

2. A system as in claim 1, for data compression and decompression, wherein said video interfacing means performing alternatively "master mode" and "slave mode" operations, said video interface means comprises:

data synchronization means for providing during "master mode" operation and receiving, during "slave mode" operations, synchronization signals, said synchronization signals provide synchronization between said system and external video equipment providing said digitized images.

3. A system as in claim 2, for data compression and decompression, wherein said video interface means further comprises external buffer memory address generation means for generating external buffer memory address for storing video data in an external video memory buffer.

4. A system as in claim 3, wherein said video interface means further comprising video frame means for, during compression, receiving from said external video equipment and storing into said external video buffer memory horizontal line-by-line "video sequence" signals of said digitized images, and retrieving from said video buffer memory buffer into said video interface means "block video pixel" data corresponding to pixels in an area within said digitized images, and for, during decompression, receiving from said video interface means and storing into said external video buffer memory said "buffer video pixel" data of said digitized images, and providing said external video equipment said "video sequence" signals of said digitized images.

5. A system as in claim 1 for data compression and decompression, wherein said Huffman coding/decoding means comprises:
    Huffman table means for storing and providing Huffman code encoding tables during compression and Huffman code decoding tables during decompression;
    coding means for translating said run length-represented coefficients of said 2-dimensional discrete cosine transform into Huffman codes using said Huffman code encoding tables; and
    decoding means for translation of said Huffman codes to said run length-represented coefficients of said 2-dimensional discrete cosine transform using said Huffman code decoding tables.

6. A system as in claim 5 for data compression and decompression, wherein said coding means comprises:
    read control means for requesting from said first-in first-out memory means a run length represented coefficient of said 2-dimensional discrete cosine transform;
    coding address means for providing an address constructed from said run length-represented coefficient of said 2-dimensional discrete cosine transform to said Huffman table means for requesting an entry in said Huffman code encoding tables; and
    Huffman code output means for providing said entry in said Huffman code encoding tables as output Huffman code.

7. A system as in claim 5 for data compression and decompression, wherein said decoding means comprises:
    Huffman code receiving means for receiving a Huffman code;
    decoding address means for providing an address, constructed from either said Huffman code or a next address, to said Huffman table means for requesting an entry in said Huffman code decoding tables;
    decoding control means for examining said entry of said Huffman code decoding tables to determine if said entry of said Huffman code decoding tables is a run-length represented coefficient of said 2-dimensional discrete cosine transform or comprises a next address, and for providing said next address to said decoding address means when said entry of said Huffman code decoding table comprises a next address; and
    Huffman decode output means for providing said run-length represented coefficient of said 2-dimensional discrete cosine transform as an output Huffman decoded datum.

8. A system for data compression and decompression, comprising:
    video interface means for receiving and transmitting digitized images;
    discrete cosine transform means for performing, during data compression, a 2-dimensional discrete cosine transform on data received by said video interface means, and providing coefficients of said 2-dimensional discrete cosine transform, and for performing, during data decompression, a 2-dimensional inverse discrete cosine transform, and providing as output data said coefficients of said 2-dimensional inverse discrete cosine transform to said video interface for transmission as digitized images;
    quantization means for attenuating, during data compression, higher frequency coefficients of said 2-dimensional discrete cosine transform, and for partially restoring, during data decompression, said higher frequency coefficients of said 2-dimensional discrete cosine transform, in preparation for said 2-dimensional inverse discrete cosine transform;
    zig-zag means for rearranging, during data compression, said coefficients of said 2-dimensional discrete cosine transform from "sequential" order into "zig-zag" order, and for rearranging, during data decompression, said zig-zag ordered coefficients of said 2-dimensional discrete cosine transform from a "zig-zag" order to a "sequential" order;
    data packing and unpacking means for packing, during data compression, said "zig-zag" ordered coefficients of said 2-dimensional discrete cosine transform as run length-represented coefficients of said 2-dimensional discrete cosine transform, and for unpacking, during data decompression, said run length-represented coefficients of said 2-dimensional discrete cosine transform to said "zig-zag" ordered coefficients of said 2-dimensional discrete cosine transform;
    Huffman coding/decoding means for coding, during data compression, said run length-represented coefficients of said 2-dimensional discrete cosine transform into Huffman codes, and for decoding, during data decompression, said Huffman codes into said run length-represented coefficients of said 2-dimensional discrete cosine transform;
    first-in first-out memory means for temporary storage of said run length represented coefficients of said 2-dimensional discrete cosine transform such that said Huffman coding/decoding means operates asynchronously and independent of said data packing and unpacking means; and
    host interface means for transmitting, during data compression, said Huffman codes to a host computer, and for retrieving, during data decompression, said Huffman codes from a host computer;
    wherein said first-in first-out memory means provides a plurality of status signals indicating the usage of said first-in first-out memory means, and wherein said system further comprises adaptive control means for varying compression ratios achieved on said digitized images during compression according to said status signals.

9. A system as in claim 8, wherein said quantization means achieved attenuation of said higher frequencies coefficients of said 2-dimensional discrete cosine transform by combining each of said coefficients of said discrete cosine transform with a corresponding quantization constant, and wherein said adaptive control means varies compression ratios achieved on said digitized images by varying said quantization constant.

10. A system as in claim 8, wherein said adaptive control means varies compression ratios achieved on said digitized image by zeroing said "zig-zag" ordered coefficients of said 2-dimensional discrete cosine transform after a predetermined number of said "zig-zag" ordered coefficients are received.

11. A system as in claim 10, wherein said predetermined number is selected from a plurality of predetermined values according to said status signals.

12. A system as in claim 8 further comprising overall adaptive control means for enabling and disabling said adaptive control means, wherein said overall adaptive control means monitors and examines, at predetermined points in the course of receiving said digitized images, the compression ratio achieved on said digitized image against a set predetermined compression targets, and when any of said predetermined targets is exceeded, said overall adaptive control means enables said adaptive control means, otherwise said overall adaptive control means disables said adaptive control means.

13. A method for data compression and decompression, comprising:
provided a video interface means for receiving and transmitting digitized images as a stream of composite pixels, each composite pixel being data of a plurality of chrominance and luminance component types;
providing block memory means for receiving and sorting, during data compression, said stream of composite pixels from said video interface means into single-component type data blocks, and for receiving and reconstituting, during data decompression, single-component type data blocks into said stream of composite pixels;
providing a discrete cosine transform means for performing, during data compression, a 2-dimensional discrete cosine transform on single-component type data blocks received from said block memory means, and providing coefficients of said 2-dimensional discrete cosine transform, and for performing, during data decompression, a 2-dimensional inverse discrete cosine transform, and providing as output data said coefficients of said 2-dimensional inverse discrete cosine transform to said block memory means as single-component type data blocks;
providing a quantization means for attenuating, during data compression, higher frequency coefficients of said 2-dimensional discrete cosine transform, and for partially restoring, during data decompression, said higher frequency coefficients of said 2-dimensional discrete cosine transform, in preparation for said 2-dimensional inverse discrete cosine transform;
providing a zig-zag means for rearranging, during data compression, said coefficients of said 2-dimensional discrete cosine transform from "sequential" order into "zig-zag" order, and for rearranging, during data decompression, said zig-zag ordered coefficients of said 2-dimensional discrete cosine transform from a "zig-zag" order to a "sequential" order;
providing a data packing and unpacking means for packing, during data compression, said "zig-zag" ordered coefficients of said 2-dimensional discrete cosine transform as run length-represented coefficients of said 2-dimensional discrete cosine transform, said run length-represented coefficients of said 2-dimensional discrete cosine transform represent runs of zero coefficients as run lengths of zero coefficients, and for unpacking, during data decompression, said run length-represented coefficients of said 2-dimensional discrete cosine transform to said "zig-zag" ordered coefficients of said 2-dimensional discrete cosine transform;
providing a Huffman coding/decoding means for coding, during data compression, said run length-represented coefficients of said 2-dimensional discrete cosine transform into Huffman codes, and for decoding, during data decompression, said Huffman codes into said run length-represented coefficients of said 2-dimensional discrete cosine transform;
providing a first-in first-out means for temporary storage of said run-length represented coefficients of said 2-dimensional discrete cosine transform such that said Huffman coding/decoding means operates asynchronously and independent of said data packing and unpacking means; and
providing a host interface means for transmitting, during data compression, said Huffman codes to a host computer, and for retrieving, during data decompression, said Huffman codes from a host computer.

* * * * *

UNITED STATES PATENT AND TRADEMARK OFFICE
CERTIFICATE OF CORRECTION

PATENT NO. : 5,253,078

DATED : October 12, 1993

INVENTOR(S) : Alexandre Balkanski, Stephen C. Purcell, James W. Kirkpatrick, Jr., Mauro Bonomi and Wen-Chang Hsu It is certified that error appears in the above-indentified patent and that said Letters Patent is hereby corrected as shown below:

Col. 5, line 63, delete "proVides" and insert --provides--.

Col. 9, line 48, after "$A_{30}$" insert --$A_{21}$--.

Col. 12, line 19, delete "1/0" and insert --I/O--.

Col. 18, line 11, delete "table" and insert --tables--.

Col. 22, line 63, delete "11?" and insert --110--.

Signed and Sealed this

Thirteenth Day of September, 1994

Attest:

BRUCE LEHMAN

Attesting Officer     Commissioner of Patents and Trademarks